United States Patent
Lee et al.

(10) Patent No.: US 10,613,266 B2
(45) Date of Patent: Apr. 7, 2020

(54) BACKLIGHT UNIT AND DISPLAY DEVICE INCLUDING THE SAME

(71) Applicant: Samsung Display Co., Ltd., Yongin-Si, Gyeonggi-Do (KR)

(72) Inventors: Hyesog Lee, Osan-si (KR); Byungchoon Yang, Seoul (KR); Jaeho You, Gwangmyeong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/920,841

(22) Filed: Mar. 14, 2018

(65) Prior Publication Data

US 2018/0364409 A1    Dec. 20, 2018

(30) Foreign Application Priority Data

Jun. 16, 2017    (KR) ........................ 10-2017-0076905

(51) Int. Cl.
*G02F 1/133* (2006.01)
*F21V 8/00* (2006.01)
(Continued)

(52) U.S. Cl.
CPC ........... *G02B 6/0031* (2013.01); *G02B 6/005* (2013.01); *G02B 6/0025* (2013.01); *G02B 6/0055* (2013.01); *G02F 1/133615* (2013.01); *G02B 6/0088* (2013.01); *G02F 1/1368* (2013.01); *G02F 1/133512* (2013.01); *G02F 1/133514* (2013.01); *G02F 1/133528* (2013.01); *G02F 1/133617* (2013.01); *G02F 1/136286* (2013.01); *G02F 2202/36* (2013.01); *G02F 2203/09* (2013.01)

(58) Field of Classification Search
CPC .................................................. G02B 6/0031
See application file for complete search history.

(56) References Cited

U.S. PATENT DOCUMENTS

| | | | | |
|---|---|---|---|---|
| 5,700,078 A | * | 12/1997 | Fohl ..................... | B60Q 1/0011 362/259 |
| 6,429,429 B1 | * | 8/2002 | Fohl ...................... | G02B 5/136 250/338.1 |

(Continued)

FOREIGN PATENT DOCUMENTS

| KR | 1020150029173 A | 3/2015 |
|---|---|---|
| KR | 1020160060522 A | 5/2016 |
| KR | 1020160120757 A | 10/2016 |

OTHER PUBLICATIONS

Wei Hu, et al., Flat-Panel Coherent Backlight for Holographic Displays with Improved Diffraction Efficiency, Jun. 2015, 36.3, pp. 530-533, SID 2015 Digest.

*Primary Examiner* — James A Dudek
(74) *Attorney, Agent, or Firm* — Cantor Colburn LLP

(57) ABSTRACT

A display device includes a display module and a backlight unit which provides a light having a coherent property to the display module. The backlight unit includes a light source which generates the light having the coherent property, a beam splitter array including a plurality of transflective plates which transmit or reflect the light provided from the light source, and a light conversion structure which is provided below the display module, receives the light reflected by the transflective plates and guides the received light in a direction toward the display module.

33 Claims, 20 Drawing Sheets

(51) Int. Cl.
*G02F 1/1335* (2006.01)
*G02F 1/1368* (2006.01)
*G02F 1/1362* (2006.01)

(56) References Cited

U.S. PATENT DOCUMENTS

| | | | | |
|---|---|---|---|---|
| 7,740,392 B2* | 6/2010 | Itoh | | G02B 6/0016 362/553 |
| 7,798,660 B2* | 9/2010 | Itoh | | G02B 6/0028 349/96 |
| 7,905,603 B2* | 3/2011 | Freeman | | G02B 5/1814 353/122 |
| 8,233,113 B2* | 7/2012 | Shikii | | F21V 9/14 349/61 |
| 8,379,172 B2* | 2/2013 | Nagata | | G02B 6/005 349/106 |
| 8,714,781 B2* | 5/2014 | Nichol | | G02B 6/0018 362/296.01 |
| 8,764,262 B2* | 7/2014 | Nichol | | G02B 6/002 362/581 |
| 8,786,803 B2* | 7/2014 | Kim | | G02F 1/133615 349/58 |
| 9,039,905 B2* | 5/2015 | Ouderkirk | | B29D 11/00721 216/24 |
| 9,188,730 B2* | 11/2015 | Chen | | G02B 6/0068 |
| 9,341,894 B2* | 5/2016 | Chen | | G02F 1/133621 |
| 9,470,832 B2* | 10/2016 | Kurashige | | G02B 6/0023 |
| 9,477,114 B2* | 10/2016 | Chen | | G02F 1/133602 |
| 9,817,173 B2* | 11/2017 | Ouderkirk | | G02B 6/0028 |
| 9,910,205 B2* | 3/2018 | Onoda | | G02B 6/0031 |
| 10,031,369 B2* | 7/2018 | Wang | | G02F 1/133553 |
| 10,209,426 B2* | 2/2019 | Fukuma | | G02B 6/003 |
| 10,222,535 B2* | 3/2019 | Remhof | | G02B 6/0018 |
| 2003/0117792 A1* | 6/2003 | Kunimochi | | G02B 6/0013 362/610 |
| 2007/0153862 A1* | 7/2007 | Shchegrov | | G02B 27/102 372/50.124 |
| 2007/0159673 A1* | 7/2007 | Freeman | | G02B 5/1814 359/19 |
| 2008/0025043 A1* | 1/2008 | Lee | | G02B 6/0028 362/608 |
| 2008/0192173 A1* | 8/2008 | Itoh | | G02B 6/0016 349/61 |
| 2008/0232133 A1* | 9/2008 | Segawa | | G02B 6/002 362/610 |
| 2008/0247150 A1* | 10/2008 | Itoh | | G02B 6/0028 362/19 |
| 2009/0190068 A1* | 7/2009 | Kawamura | | B82Y 20/00 349/65 |
| 2009/0316431 A1* | 12/2009 | Nagata | | G02B 6/0028 362/609 |
| 2010/0045894 A1* | 2/2010 | Itoh | | G02B 6/0025 349/61 |
| 2011/0026270 A1* | 2/2011 | Onishi | | G02B 6/0025 362/607 |
| 2011/0116010 A1* | 5/2011 | Nagata | | G02B 6/005 349/62 |
| 2013/0155723 A1* | 6/2013 | Coleman | | G02B 6/0018 362/621 |
| 2013/0213929 A1* | 8/2013 | Ouderkirk | | B29D 11/00721 216/24 |
| 2013/0216182 A1* | 8/2013 | Ouderkirk | | G02B 6/26 385/31 |
| 2014/0063853 A1* | 3/2014 | Nichol | | G02B 6/0028 362/616 |
| 2015/0009648 A1* | 1/2015 | Ouderkirck | | G02B 6/0028 362/19 |
| 2015/0062487 A1* | 3/2015 | Chen | | G02F 1/133602 349/62 |
| 2015/0070932 A1* | 3/2015 | Kim | | G02B 6/0028 362/610 |
| 2015/0168637 A1* | 6/2015 | Chen | | G02B 6/0068 362/609 |
| 2016/0139323 A1* | 5/2016 | Remhof | | G02B 6/0018 362/609 |
| 2016/0147003 A1* | 5/2016 | Morozov | | G02B 6/0023 359/11 |
| 2016/0353092 A1 | 12/2016 | Bruder et al. | | |
| 2017/0153376 A1* | 6/2017 | Onoda | | G02B 6/0031 |
| 2017/0285243 A1* | 10/2017 | Nichol | | G02B 6/0035 |
| 2018/0032030 A1* | 2/2018 | Kim | | G02B 6/0031 |
| 2018/0059305 A1* | 3/2018 | Popovich | | G02B 6/0016 |
| 2018/0094791 A1* | 4/2018 | Lee | | F21V 5/00 |
| 2018/0101087 A1* | 4/2018 | Shinohara | | G02B 6/00 |
| 2018/0136383 A1* | 5/2018 | Choi | | G02B 5/32 |
| 2018/0364409 A1* | 12/2018 | Lee | | G02B 6/0031 |
| 2018/0372940 A1* | 12/2018 | Ishii | | G02B 6/0031 |
| 2019/0064420 A1* | 2/2019 | Lee | | G02B 6/0016 |
| 2019/0101681 A1* | 4/2019 | Meng | | G02B 6/005 |

* cited by examiner

BACKLIGHT UNIT AND DISPLAY DEVICE INCLUDING THE SAME

This application claims priority under 35 U.S.C. § 119 to Korean Patent Application No. 10-2017-0076905, filed on Jun. 16, 2017, and all the benefits accruing therefrom under 35 U.S.C. § 119, the content of which in its entirety is herein incorporated by reference.

BACKGROUND

1. Field

Exemplary embodiments of the invention relate to a backlight unit and a display device including the same, and in particular, to a backlight unit having a reduced thickness and a display device including the same.

2. Description of the Related Art

Electronic products, such as mobile communication terminals, digital cameras, notebook computers, monitors, and television sets, include a display device which displays an image.

In general, the display device includes a display panel for producing an image and a backlight unit for providing light to the display panel. The display panel controls transmittance of light transmitted from the backlight unit, when an image is displayed.

The backlight units are classified into two types which are an edge-type backlight unit providing light to a display panel through a side surface of the display panel and a direct-type backlight unit providing light to a display panel through a bottom surface of the display panel, for example. The edge-type backlight unit has a light source for generating light and a light guide plate for controlling a propagation direction of the light. The light source is placed at a side of the light guide plate, and the light guide plate guides the light, which is transmitted from the light source, to the display panel. According to a shape of light beam generated by the light source, the light source is classified into a point light source, a linear light source and a surface light source, for example.

SUMMARY

Exemplary embodiments of the invention provide a backlight unit having a reduced thickness and a display device including the same.

According to an exemplary embodiment of the invention, a display device may include a display module and a backlight unit which provides a light having a coherent property to the display module. The backlight unit may include a light source which generates the light having the coherent property, a beam splitter array including a plurality of transflective plates which transmit or reflect the light provided from the light source, and a light conversion structure which is provided below the display module, receives the light reflected by the plurality of transflective plates and guides the received light in a direction toward the display module.

In an exemplary embodiment, the display device may further include an optical film which is provided on the light conversion structure and changes a propagation direction of light, which is incident from the light conversion structure, to a predetermined direction.

In an exemplary embodiment, the optical film may include a plurality of diffraction patterns.

In an exemplary embodiment, each of the plurality of transflective plates may be tilted at an angle of about 45 degrees (°) relative to a propagation direction of the light provided from the light source, in a top plan view.

In an exemplary embodiment, the plurality of transflective plates may have decreasing transmittance and increasing reflectance, when a distance between the plurality of transflective plates and the light source increases.

In an exemplary embodiment, the beam splitter array may further include a light transmission part including a transparent material, and the plurality of transflective plates may be provided in the light transmission part.

In an exemplary embodiment, the light conversion structure may include a light guide plate.

In an exemplary embodiment, the display device may further include a prism bar provided between the light guide plate and the beam splitter array. The prism bar may extend parallel to a light incidence surface of the light guide plate and may change a propagation direction of light that is incident into the light guide plate from the beam splitter array.

In an exemplary embodiment, the prism bar may be a right triangular pillar-shaped structure with an inclined surface.

In an exemplary embodiment, the prism bar may be coupled with the light guide plate to form a single body, and the inclined surface may be inclined toward the beam splitter array.

In an exemplary embodiment, the prism bar may have a refractive index that is substantially the same as that of the light guide plate.

In an exemplary embodiment, the prism bar may be coupled with the beam splitter array to form a single body, and the inclined surface may be inclined toward the light guide plate.

In an exemplary embodiment, the light transmission part may have a refractive index that is substantially the same as that of the prism bar.

In an exemplary embodiment, the prism bar may be coupled with the light guide plate to form a single body, the inclined surface of the prism bar may be inclined toward the light guide plate, and a light incidence surface of the light guide plate may be in contact with the inclined surface of the prism bar in entirety.

In an exemplary embodiment, the prism bar may have a different refractive index from that of the light guide plate.

In an exemplary embodiment, the light conversion structure may further include a reflection plate provided below the light guide plate.

In an exemplary embodiment, the light source may include a light source unit which generates the light having the coherent property and a beam expander which expands the light generated by the light source unit.

In an exemplary embodiment, the beam splitter array may further include a first surface, to which the light generated by the light source is incident, a second surface, from which light reflected by the plurality of transflective plates is emitted, the second surface facing the light conversion structure, a third surface located opposite to the second surface, and a fourth surface located opposite to the first surface.

In an exemplary embodiment, the beam splitter array may further include a first absorption member provided on the third surface and a second absorption member provided on the fourth surface.

In an exemplary embodiment, the light conversion structure may include a reflection plate.

In an exemplary embodiment, the display device may further include an optical film, which is provided on the reflection plate to change a propagation direction of light, which is incident from the reflection plate, to a predetermined direction. The reflection plate and the optical film may be spaced apart from each other to define a light guide space therebetween.

In an exemplary embodiment, the display device may further include a prism bar provided between the light guide space and the beam splitter array. The prism bar may extend in parallel to the beam splitter array and may be coupled with the beam splitter array to form a single body. The prism bar may change a propagation direction of light, which is emitted from the beam splitter array, to a direction toward the reflection plate.

In an exemplary embodiment, the display device may further include a base substrate, which is provided between the reflection plate and the optical film and is laminated with the optical film to support the optical film.

In an exemplary embodiment, the plurality of transflective plates may include a metallic material.

In an exemplary embodiment, the display device may further include a supporting member, which is provided below the beam splitter array and has a supporting surface inclined toward the light conversion structure.

In an exemplary embodiment, the light source may include a plurality of light sources. The plurality of light sources may be provided to face each other with the beam splitter array interposed therebetween.

In an exemplary embodiment, the plurality of light sources may include a first light source placed adjacent to a side surface of the beam splitter array and a second light source placed adjacent to an opposite side surface of the beam splitter array. The plurality of transflective plates may include a plurality of first transflective plates, which are tilted at an angle of about 45° relative to a propagating direction of light provided from the first light source, in a top plan view, and a plurality of second transflective plates, which are tilted at an angle of about 45° relative to a propagating direction of light provided from the second light source, in a top plan view. The plurality of first transflective plates may be arranged at a right angle to the plurality of second transflective plates.

In some exemplary embodiments, the plurality of first transflective plates and the plurality of second transflective plates may have decreasing transmittance and increasing reflectance, with decreasing distance from a center region of the beam splitter array.

In an exemplary embodiment, the plurality of first transflective plates may be arranged adjacent to the first light source, compared with the plurality of second transflective plates.

In an exemplary embodiment, the plurality of first transflective plates and the plurality of second transflective plates may be alternately arranged.

In an exemplary embodiment, each of the plurality of first transflective plates and the plurality of second transflective plates may include a back surface having a transmittance higher than that of a front surface.

In an exemplary embodiment, the display module may include a first substrate including a plurality of pixels, a second substrate opposite to the first substrate, and a liquid crystal layer interposed between the first substrate and the second substrate.

In an exemplary embodiment, the display module may display a hologram image.

In an exemplary embodiment, the display module may include a first polarization plate having a transmission axis, a first substrate provided on the first polarization plate, the first substrate including a plurality of pixels, a second substrate opposite to the first substrate and provided with a color filter layer, a liquid crystal layer interposed between the first substrate and the second substrate, and a second polarization plate provided between the liquid crystal layer and the color filter layer, the second polarization plate having an absorption axis. The color filter layer may include a plurality of quantum dots.

According to an exemplary embodiment of the invention, a display device may include a display module and a backlight unit which provides a light having a coherent property to the display module. The backlight unit may include a light source which generates a first light having the coherent property and a point-like cross-section, a beam splitter array, which is provided adjacent to the light source and converts the first light provided from the light source to a second light having a linear cross-section, and a light conversion structure, which is provided below the display module and converts the second light provided from the beam splitter array to a third light having a planar cross-section. The beam splitter array may include a plurality of transflective plates, which are arranged parallel to a propagation direction of the first light and reflect at least a part of the first light in a direction toward the light conversion structure.

According to an exemplary embodiment of the invention, a backlight unit may include a light source which generates a light having a coherent property, a light guide plate which guides a propagating direction of light incident thereto to an upward direction, and a beam splitter array provided between the light source and the light guide plate. The beam splitter array may include a plurality of transflective plates. Each of the plurality of transflective plates may reflect a part of the light provided form the light source toward the light guide plate and pass another part of the light therethrough to be incident into another adjacent one of the plurality of transflective plates.

BRIEF DESCRIPTION OF THE DRAWINGS

Exemplary embodiments will be more clearly understood from the following brief description taken in conjunction with the accompanying drawings, in which.

DETAILED DESCRIPTION

Figure 1:
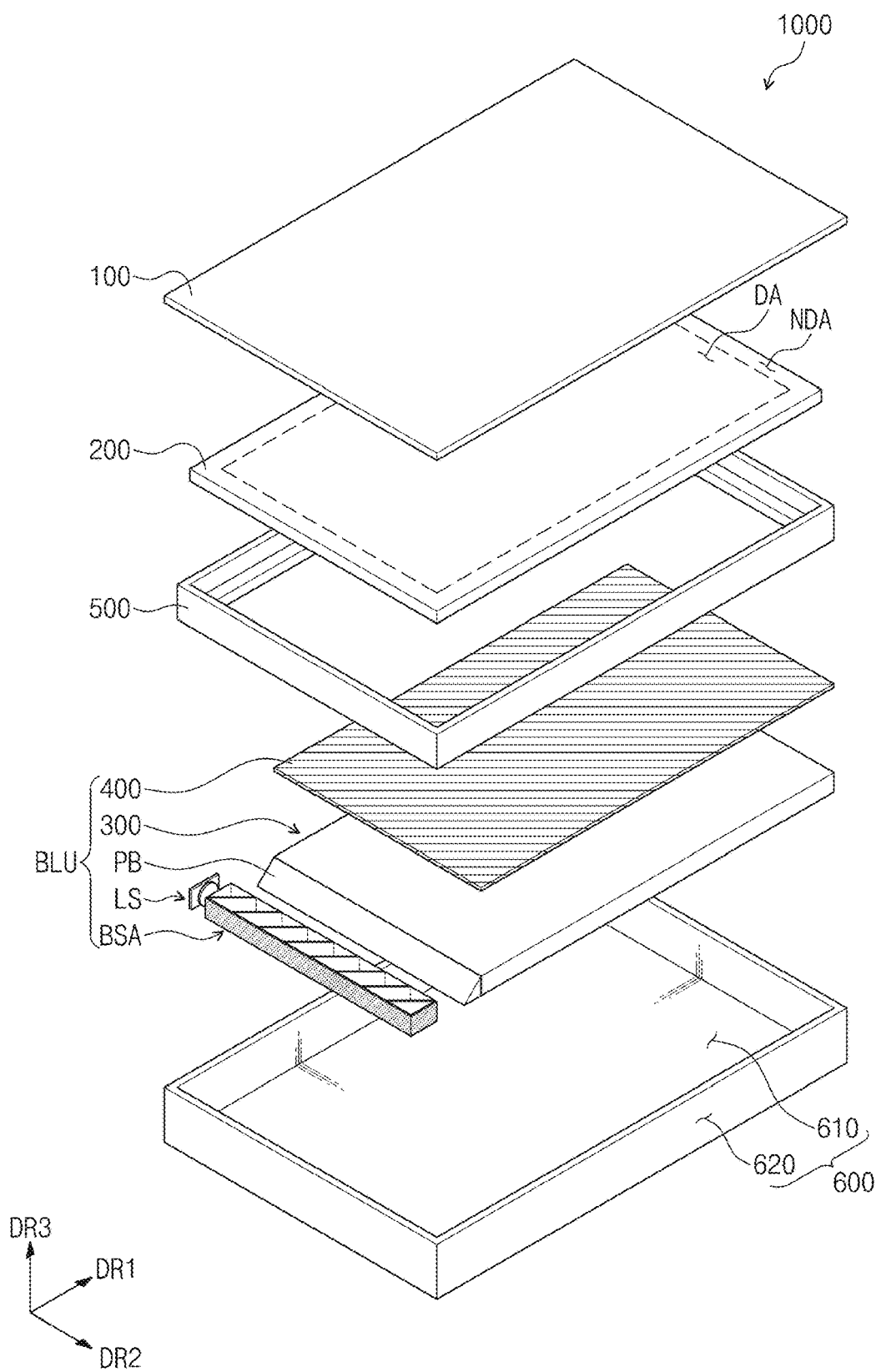
FIG. 1 is an exploded perspective view of an exemplary embodiment of a display device according to the invention.

Exemplary embodiments of the invention will now be described more fully with reference to the accompanying drawings, in which exemplary embodiments are shown. Exemplary embodiments of the invention may, however, be embodied in many different forms and should not be construed as being limited to the exemplary embodiments set forth herein; rather, these embodiments are provided so that this disclosure will be thorough and complete, and will fully convey the concept of exemplary embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the drawing figures. It will be understood that the spatially relative terms are intended to encompass different orientations of the device in use or operation in addition to the orientation depicted in the drawing figures. For example, if the device in the drawing figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which exemplary embodiments of the invention belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
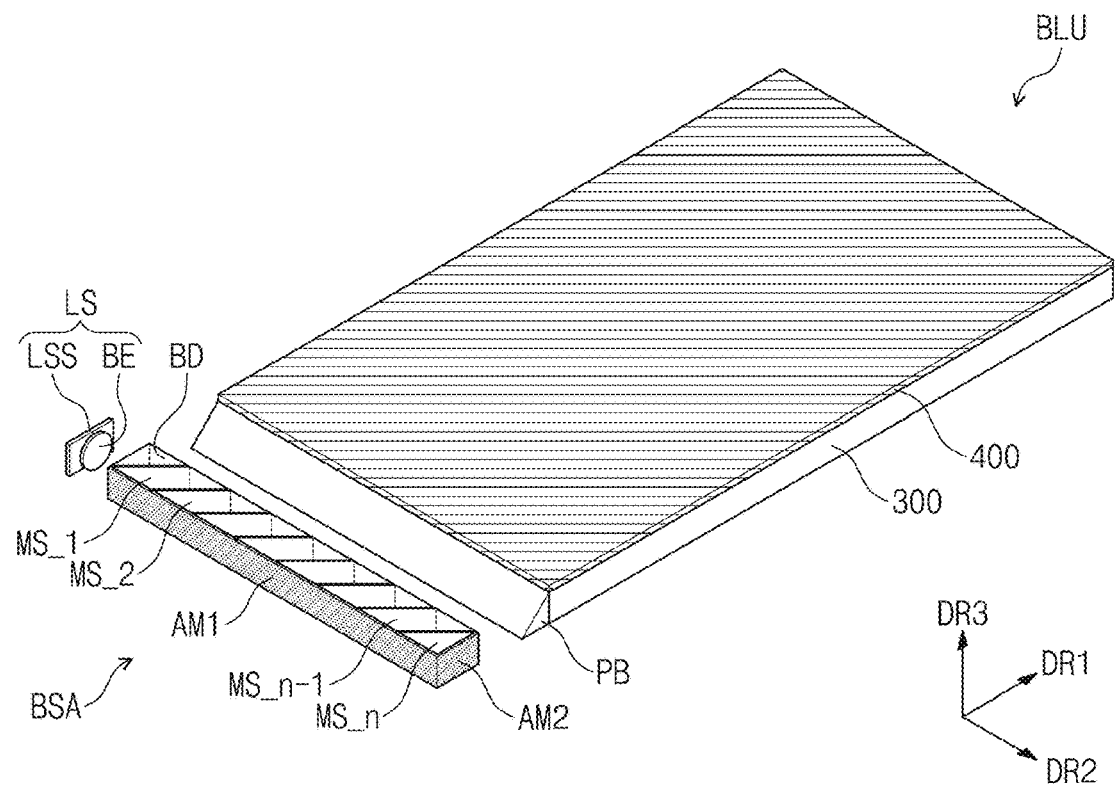
FIG. 2 is a perspective view illustrating a backlight unit of FIG. 1.

FIG. 1 is an exploded perspective view of a display device according to some exemplary embodiments of the invention, and FIG. 2 is a perspective view illustrating a backlight unit of FIG. 1.

Referring to FIG. 1, a display device 1000 according to some exemplary embodiments of the invention may include a window member 100, a display module 200, a backlight unit BLU, and a container structure 600.

For convenience in description, a propagation direction of image or light in the display device 1000 will be referred to as an upward direction, and a direction opposite to the upward direction will be referred to as a downward direction. In the illustrated exemplary embodiments, the upward and downward directions may be defined to be parallel to a third direction DR3 that is orthogonal to a first direction DR1 and a second direction DR2. Hereinafter, front and back sides of each of elements to be described below will be differentiated based on the third direction DR3. However, the directions indicated by the upward direction or the downward direction may be relative concepts, and in other exemplary embodiments, they may be changed to indicate other directions.

The window member 100 may transmit an image provided from the display module 200. The window member 100 may consist of or include at least one of glass, sapphire, and plastic, for example.

The display module 200 may be provided below the window member 100. The display module 200 may display an image using light transmitted from the backlight unit BLU.

In an exemplary embodiment, in a top plan view, the display module 200 may have a rectangular shape whose sides are parallel to the first or second direction DR1 or DR2, for example. As an example, the display module 200 may have long sides parallel to the first direction DR1 and short sides parallel to the second direction DR2.

In a top plan view, the display module 200 may include a display region DA, which displays an image, and a non-display region NDA, which does not display an image. The display region DA may be defined to be overlapped with a center region of the display module 200, in a top plan view. The non-display region NDA may be defined to surround the display region DA.

In some exemplary embodiments, the display module 200 may display a hologram image, for example. In other words, the display module 200 may include diffraction patterns. When light is incident into the display module 200, the light may be diffracted by the diffraction patterns of the display module 200, thereby forming a hologram image. The display module 200 will be described in more detail with reference to FIGS. 3 to 5.

the backlight unit BLU may be provided below the display module 200 and may provide light to the display module 200. The backlight unit BLU may include a light source LS, a beam splitter array BSA, a light conversion structure 300, and an optical film 400.

The light source LS may include a light source unit LSS and a beam expander BE.

The light source unit LSS may generate light. In the illustrated exemplary embodiments, the light source unit LSS may be a point light source that generate light having coherence (hereinafter, coherent light), for example. As an example, the light may be an intense beam (e.g., a laser beam). However, the invention is not limited thereto. In an exemplary embodiment, the light source unit LSS may generate a monochromatic light having a single frequency or a polychromatic light having several frequencies and propagating with the same phase, for example. As an example, the light source unit LSS may be a point light source light-emitting diode ("LED") or laser diode ("LD").

The beam expander BE may increase a diameter of the light transmitted from the light source unit LSS. As an example, the beam expander BE may be a concave lens. In exemplary embodiments, the beam expander BE may change a cross-sectional shape of the light. In other exemplary embodiments, the beam expander BE may be omitted.

In the illustrated exemplary embodiments, the light source LS may include one light source unit LSS and one beam expander BE, but the invention is not limited thereto. In other exemplary embodiments, the light source LS may include a plurality of light source units LSS and a plurality of beam expanders BE.

Furthermore, the invention is not limited to the kind of an optical component included in the light source LS. In other exemplary embodiments, the light source LS may further include other optical components, in addition to the light source unit LSS and the beam expander BE. Such optical components may include, for example, a mirror or a beam splitter which may change a propagation direction of the light.

In the illustrated exemplary embodiments, the beam splitter array BSA may extend in the second direction DR2. The light source LS may be provided adjacent to at least one of side surfaces of the beam splitter array BSA in the second direction DR2. The beam splitter array BSA may be provided to face the light source unit LSS, with the beam expander BE interposed therebetween, in the second direction DR2.

In the illustrated exemplary embodiments, the beam splitter array BSA may be provided below a side portion of the display module 200, when viewed in the first direction DR1. In other words, the beam splitter array BSA may be placed adjacent to one of the short sides of the display module 200. However, the invention is not limited thereto. In other exemplary embodiments, the beam splitter array BSA may be provided below a side portion of the display module 200, when viewed in the second direction DR2. In other words, the beam splitter array BSA may be placed adjacent to one of the long sides of the display module 200. In this case, the beam splitter array BSA may extend in the first direction DR1, and the light source LS may be placed adjacent to at least one of the side surfaces of the beam splitter array BSA, in the first direction DR1.

The invention is not limited to the number of the beam splitter array BSA. In other exemplary embodiments, a plurality of the beam splitter arrays BSA may be provided adjacent to bottoms surfaces of at least two side portions of the display module 200.

In a top plan view, the display region DA of the display module 200 may not be overlapped with the beam splitter array BSA.

The light (hereinafter, a first light) generated by the light source LS may propagate in the second direction DR2 and then may be incident into the beam splitter array BSA.

The beam splitter array BSA may include a light transmission part BD and a plurality of transflective plates MS_1-MS_n. The light transmission part BD may consist of or include a material having high transmittance to a visible light. As an example, the light conversion structure 300 may consist of or include a transparent polymer resin, such as polycarbonate and polymethyl methacrylate ("PMMA"). In exemplary embodiments, the light transmission part BD may consist of or include glass, for example.

The plurality of transflective plates MS_1-MS_n may be provided in the light transmission part BD. In the case where the light source LS is provided in the form of a point light source, the transflective plates MS_1-MS_n may divide a point-like light (e.g., the first light) transmitted from the light source LS into a plurality of light beams propagating toward the light conversion structure 300. The divided light beams may propagate in the first direction DR1. Each of the light beams propagating in the first direction DR1 may have a linear cross-section and will be referred to as a second light. The light (i.e., the second light) having the linear cross-section may be incident into the light conversion structure 300. The beam splitter array BSA will be described in more detail with reference to FIGS. 5 and 6.

The light conversion structure 300 may be provided below the display module 200. In a top plan view, the light conversion structure 300 may be overlapped with the display region DA of the display module 200. The light conversion structure 300 may guide the light, which is transmitted from the light source LS, in the upward direction.

In some exemplary embodiments, the light conversion structure 300 may be a light guide plate, for example. The light guide plate 300 may have a plate-shaped structure, for example. The light guide plate 300 may consist of or include a material having high transmittance to a visible light. As an example, the light guide plate 300 may consist of or include the same material as that of the light transmission part BD of the beam splitter array BSA.

The light (e.g., the second light) incident to the light guide plate 300 from the beam splitter array BSA may be reflected in the light guide plate 300. As a result of repetitive reflection of the light in the light guide plate 300, the light may propagate in a specific direction (e.g., with a critical angle), and in this case, the light may be upwardly emitted from the light guide plate 300. Here, the upwardly-emitted light (hereinafter, a third light) may be emitted through the entire top surface of the light guide plate 300, thereby having a planar cross-section.

Although not shown, in other exemplary embodiments, the light guide plate 300 may include a plurality of reflection patterns that are provided on a bottom surface of the light guide plate 300. Each of the reflection patterns may have a shape downwardly protruding from the bottom surface of the light guide plate 300. The reflection patterns may scatter or reflect light to be incident into the light guide plate 300. In the case where light is incident to the light guide plate 300 from the beam splitter array BSA, the light may be scattered or reflected by the reflection patterns, thereby propagating toward an upper portion of the light guide plate 300.

The optical film 400 may be interposed between the display module 200 and the light conversion structure 300. In the illustrated exemplary embodiments, the optical film 400 and the light conversion structure 300 may be laminated to form a single body.

The optical film 400 may transmit the light, which is incident from the light conversion structure 300, to the display module 200. In an exemplary embodiment, the optical film 400 may include a plurality of diffraction patterns. The diffraction patterns may be provided by an interference between two or more light beams. The interference fringes provided by the plurality of beams may be in the form of an equidistant grid patterns. As an example, the optical film 400 may be provided in the form of a holographic optical element ("HOE") film. The diffraction patterns may change a propagation direction of the light, which is incident from the light conversion structure 300, to a direction toward the display module 200.

In some exemplary embodiments, the backlight unit BLU may further include a prism bar PB. The prism bar PB may be placed between the beam splitter array BSA and the light conversion structure 300. The beam splitter array BSA, the prism bar PB and the light conversion structure 300 may be arranged in the first direction DR1.

The prism bar PB may be a pillar-shaped structure extending in the second direction DR2, for example. The prism bar PB may be placed to face a light incidence surface of the light guide plate 300.

The prism bar PB may change a propagation direction of light (e.g., the second light), which is emitted from the beam splitter array BSA and then is incident into the light guide plate 300. In detail, the prism bar PB may change the propagation direction of the light (e.g., the second light) to be incident into the light guide plate 300 so that the light (e.g., the second light) is easily reflected in the light guide plate 300. The prism bar PB may consist of or include the same material as that of the light guide plate 300.

In the illustrated exemplary embodiments, the prism bar PB may be a right triangular pillar-shaped structure with an inclined surface, for example. The inclined surface of the prism bar PB may be inclined toward the beam splitter array BSA. In detail, a height of the inclined surface of the prism bar PB in a third direction DR3 may decrease with increasing distance from the light guide plate 300 or with decreasing distance from the beam splitter array BSA.

In the illustrated exemplary embodiments, the prism bar PB and the light guide plate 300 may be coupled to form a single body. Accordingly, the light (e.g., the second light) emitted from the beam splitter array BSA may be incident into the inclined surface of the prism bar PB and then may be provided to the light guide plate 300.

The light guide plate 300 may have the same refractive index as that of the prism bar PB. As an example, the light guide plate 300 and the prism bar PB may have a refractive index ranging from about 1.4 to about 1.6.

In some exemplary embodiments, the light guide plate 300, the light transmission part BD of the beam splitter array BSA, and the prism bar PB may have the same refractive index. That is, in the case where the light guide plate 300, the light transmission part BD, and the prism bar PB have first, second, and third refractive indices n1, n2, and n3, all of the first to third refractive indices n1, n2, and n3 may be the same.

The container structure 600 may be provided at the lowermost position of the display device 1000 and may contain the backlight unit BLU. The container structure 600 may include a bottom portion 610 and a plurality of sidewall portions 620, which are connected to the bottom portion 610. In the illustrated exemplary embodiments, the beam splitter array BSA and the light source LS may be provided on an inner side surface of at least one of the sidewall portions 620 of the container structure 600. The container structure 600 may consist of or include a metallic material having sufficiently high hardness.

In some exemplary embodiments, the display device 1000 may further include a mold frame 500. The mold frame 500 may be provided on the optical film 400. In the illustrated exemplary embodiments, the mold frame 500 may have a frame shape, for example. In detail, the mold frame 500 may be provided to face an edge region of a top surface of the optical film 400. The mold frame 500 may fix and hold the display module 200 and the backlight unit BLU.

Figure 3:
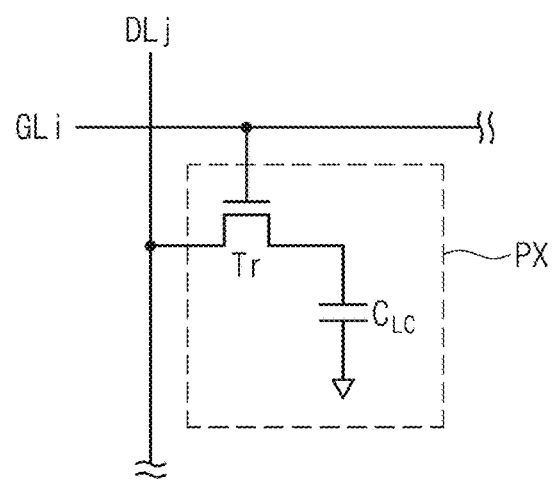
FIG. 3 is a circuit diagram of an exemplary embodiment of a pixel according to the invention.
Figure 4:
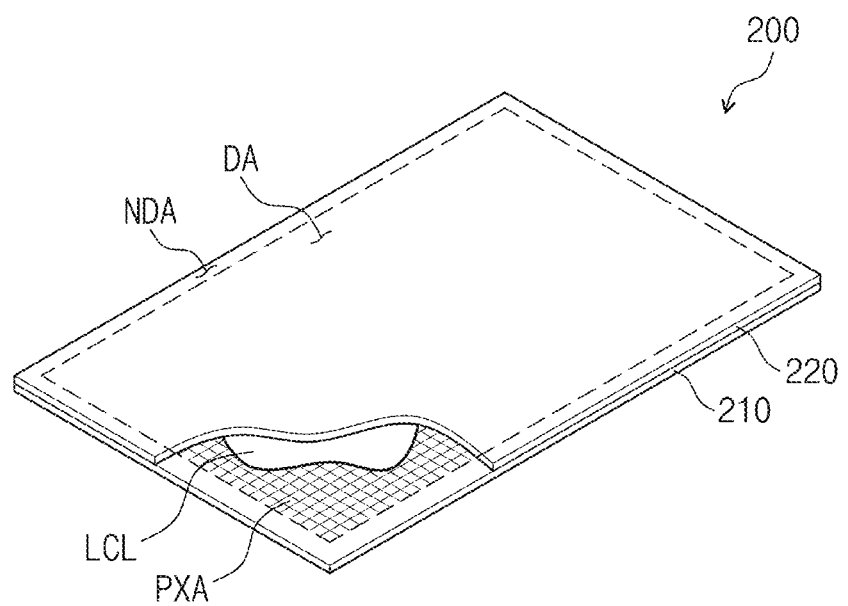
FIG. 4 is a perspective view illustrating a display module of FIG. 1.

FIG. 3 is a circuit diagram of a pixel according to some exemplary embodiments of the invention, and FIG. 4 is a perspective view illustrating a display module of FIG. 1.

Referring to FIGS. 3 and 4, the display module 200 may include a first substrate 210, a second substrate 220, and a liquid crystal layer LCL. The first substrate 210 and the second substrate 220 may be provided to face each other, and the liquid crystal layer LCL may be provided between the first substrate 210 and the second substrate 220.

The first substrate 210 may include a plurality of pixel regions PXA. A plurality of pixels (not shown) may be provided on the pixel regions PXA, respectively. In an exemplary embodiment, the pixel regions PXA may be arranged in a matrix shape. However, the invention is not limited thereto, and the pixel regions PXA may include various other shapes.

The first substrate 210 may include a plurality of gate lines, a plurality of data lines, and a plurality of thin-film transistors ("TFTs") and a plurality of pixel electrodes constituting a plurality of pixels. Although not shown, the plurality of gate lines may extend in the first direction DR1 and may be arranged in the second direction DR2. The plurality of data lines may be provided to cross the gate lines and may be electrically disconnected from the gate lines.

FIG. 3 illustrates a pixel PX which is provided on one of the pixel regions PXA. Although not shown, the others of the pixels in the display module 200 may have the same or similar structure as the pixel PX to be described with reference to FIG. 3.

The pixel PX may be connected to a corresponding one (e.g., a gate line GLi) of the gate lines and to a corresponding one (e.g., a data line DLj) of the data lines. The pixel PX may be turned on in response to a gate signal to be transmitted through the gate line GLi. The pixel PX may include a TFT Tr and a liquid crystal capacitor CLC, which is connected to the TFT Tr.

The TFT Tr may output a data signal applied to the data line DLj, in response to the gate signal applied to the gate line GLi. The data signal applied to each pixel PX may be a diffraction pattern signal.

The liquid crystal layer LCL may include liquid crystal molecules having an orientational property. The liquid crystal molecules may be variously arranged, depending on a magnitude of an electric field that is generated when there is a difference in voltage between a common electrode and the pixel electrode. The arrangement of the liquid crystal molecules may be changed to control an amount of light passing through the liquid crystal layer LCL. A shape or arrangement of the diffraction patterns may be determined by the arrangement of the liquid crystal molecules.

As described above, the liquid crystal layer LCL of the display module 200 may form the diffraction patterns for displaying a hologram image, but the invention is not limited thereto. In other exemplary embodiments, the display module 200 may display a gradation-based image, for example, not the hologram image. In this case, a diffusion sheet (not shown) may be further provided between the display module 200 and the backlight unit BLU.

Figure 5:
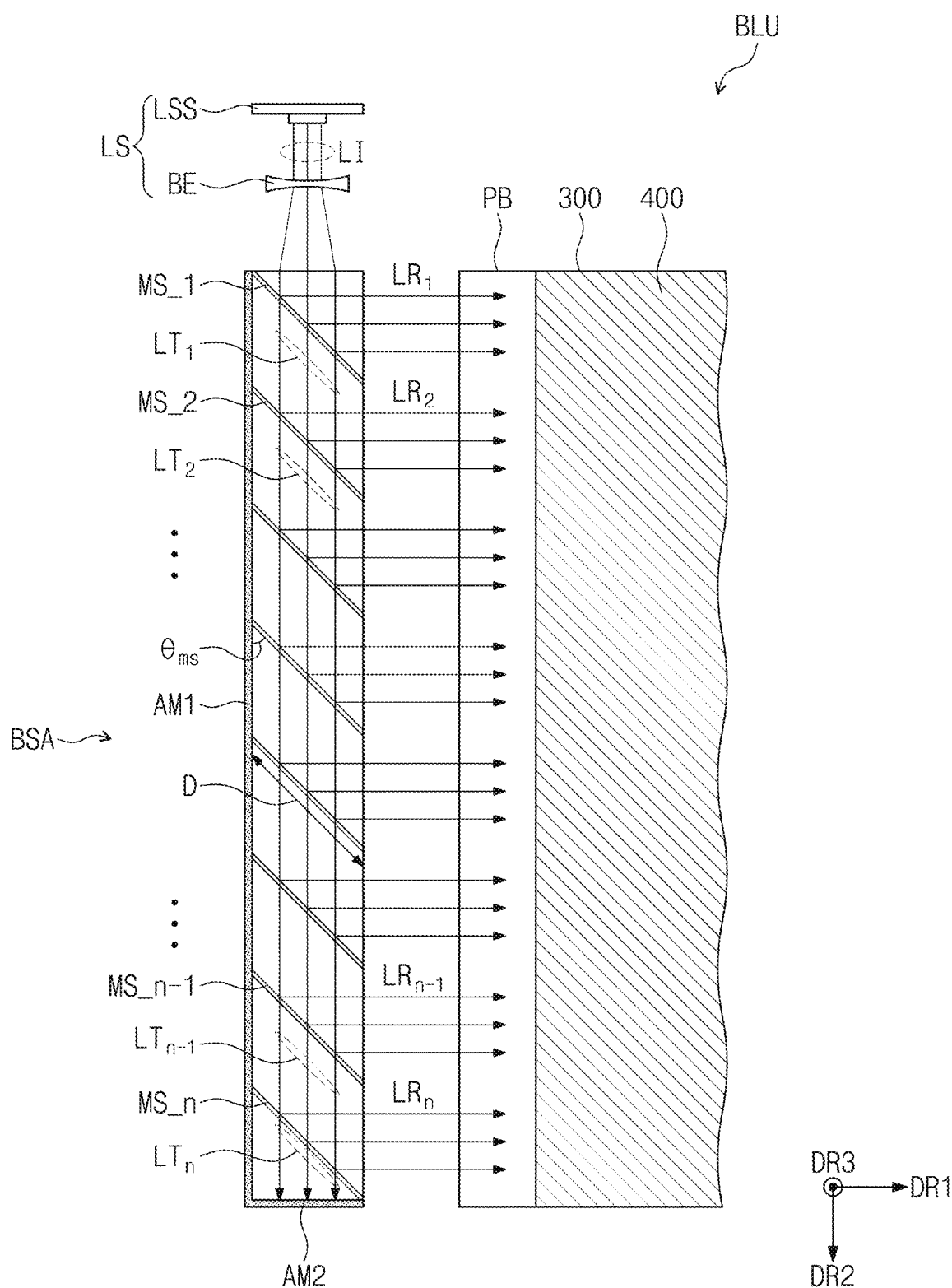
FIG. 5 is a top plan view illustrating the backlight unit of FIG. 2.

FIG. 5 is a top plan view illustrating the backlight unit of FIG. 2.

Figure 6:
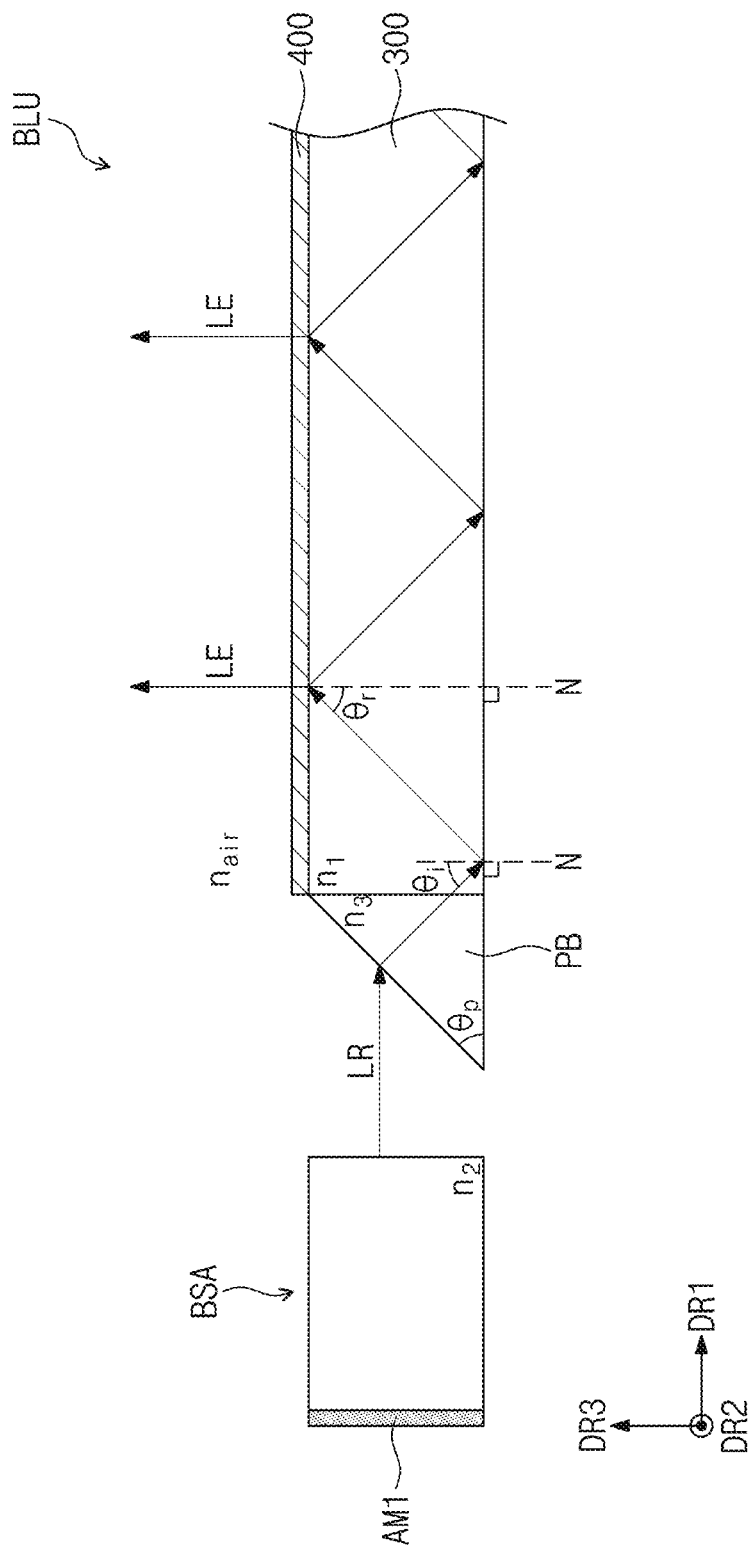
FIG. 6 is an enlarged cross-sectional view schematically illustrating a portion of the backlight unit of FIG. 2.

FIG. 6 is an enlarged cross-sectional view schematically illustrating a portion of the backlight unit of FIG. 2.

Referring to FIGS. 5 and 6, a light LI (hereinafter, a first light) generated by the light source unit LSS may be expanded by the beam expander BE and then may be incident into a side surface of the beam splitter array BSA.

Although not shown, side surfaces of the beam splitter array BSA may include first to fourth surfaces. The first surface may refer to a surface of the beam splitter array BSA, to which the light LI (i.e., the first light) generated by the light source LS is incident. The second surface and the third surface may refer to surfaces of the beam splitter array BSA, which are positioned to face the light conversion structure 300. The second surface may be positioned adjacent to the light conversion structure 300, compared with the third surface. The fourth surface may refer to a surface of the beam splitter array BSA facing the first surface, when viewed in the second direction DR2.

The beam splitter array BSA may include the light transmission part BD (e.g., refer to FIG. 2) and the plurality of transflective plates MS_1-MS_n. The transflective plates MS_1-MS_n may be arranged in the second direction DR2.

The transflective plates MS_1-MS_n may be provided to be tilted at an angle of about 45 degrees (°) relative to a propagation direction of the light LI (i.e., the first light) incident from the light source LS. In other words, each of the transflective plates MS_1-MS_n may be inclined at a transflective plate angle $\theta_{ms}$ of about 45° relative to the second direction DR2. In detail, each of the transflective plates MS_1-MS_n may be tilted by an angle of about 45° in a clockwise direction from the first surface of the beam splitter array BSA and by an angle of about 45° in a counterclockwise direction from the third surface.

The transflective plates MS_1-MS_n may not only partially transmit but also partially reflect light, which is incident thereto. Each of the transflective plates MS_1-MS_n may consist of or include a metallic material. As an example, each of the transflective plates MS_1-MS_n may consist of or include at least one of gold, silver, and aluminum.

In the illustrated exemplary embodiments, the beam splitter array BSA may further include a first absorption member AM1 and a second absorption member AM2, which are respectively provided on the third and fourth surfaces. The first absorption member AM1 and the second absorption member AM2 may have a black color. The first absorption member AM1 and the second absorption member AM2 may be configured to absorb light incident into the third surface and the fourth surface, and this may make it possible to prevent light from being emitted to the outside of the beam splitter array BSA through the third surface and the fourth surface. Accordingly, the first absorption member AM1 and the second absorption member AM2 may prevent a light leakage from occurring.

If the light LI (i.e., the first light) is incident into the first surface of the beam splitter array BSA, it may be incident into a first transflective plate MS_1. The light LI (i.e., the first light) incident into the first transflective plate MS_1 may be split into a light beam $LR_1$, which is reflected by the first transflective plate MS_1 and then is emitted to the outside of the beam splitter array BSA through the second surface, and another light beam $LT_1$, which passes through the first transflective plate MS_1 and is incident into a second transflective plate MS_2.

The light beam $LT_1$ incident into the second transflective plate MS_2 may be split into a light beam $LR_2$, which is reflected by the second transflective plate MS_2 and then is emitted to the outside of the beam splitter array BSA through the second surface, and another light beam $LT_2$, which passes through the second transflective plate MS_2 and then is incident into a third transflective plate (not shown).

Light beam $LT_{n-1}$, which passes through an (n−1)-th transflective plate MS_n-1 and is incident into an n-th transflective plate MS_n, may be split into a light beam $LR_n$, which is reflected by the n-th transflective plate MS_n and then is emitted to the outside of the beam splitter array BSA through the second surface, and another light beam $LT_n$, which passes through the n-th transflective plate MS_n and then is absorbed by the second absorption member AM2. In other exemplary embodiments, there may be no light passing through the n-th plate transflective MS_n. In this case, the second absorption member AM2 may be omitted.

As described above, the first to n-th transflective plates MS_1-MS_n may sequentially transmit or reflect the light LI (i.e., the first light), which is generated by the light source LS and is incident into the beam splitter array BSA. In the illustrated exemplary embodiments, the transflective plates MS_1-MS_n may reflect the light beams $LR_1$-$LR_n$ with the same light amount. In other words, the transflective plates MS_1-MS_n may have decreasing transmittance and increasing reflectance, with increasing distance from the light source LS. According to the aforementioned feature, light LR may have a uniform brightness and a linear cross-section, when the light LR is incident into the light conversion structure 300 from the beam splitter array BSA.

Adjacent ones of the transflective plates MS_1-MS_n may be spaced apart from each other by the same distance in the second direction DR2. As an example, when each of the transflective plates MS_1-MS_n has a length of D, a distance between each pair of adjacent ones of the transflective plates MS_1-MS_n in the second direction DR2 may be given by D*sin (45°). In the case where the distance between each pair of adjacent ones of the transflective plates MS_1-MS_n is greater than D*sin (45°), a dark region may occur between the lights beams $LR_1$-$LR_n$ reflected by the transflective plates MS_1-MS_n. In the case where the distance between each adjacent pair of the transflective plates MS_1-MS_n is less than D*sin(45°), the lights beams $LR_1$-$LR_n$ reflected by the transflective plates MS_1-MS_n may be re-reflected by an adjacent one of the transflective plates MS_1-MS_n, and this may lead a change in a light propagation direction. In other words, brightness of the light LR incident into the light conversion structure 300 may be non-uniform. However, the distance between each pair of adjacent ones of the transflective plates MS_1-MS_n may not be limited to that in the above example.

The light LR (e.g., the second light) emitted from the beam splitter array BSA may propagate in the first direction DR1 and then may be incident into an inclined surface of the prism bar PB. The inclined surface may change a propagation direction of the incident light LR to a downward direction, and thus, the light LR may be provided to the bottom surface of the light guide plate 300.

In the illustrated exemplary embodiments, referring to FIG. 6, an incident angle $\theta_i$ of the light LR may be changed depending on a prism angle $\theta_p$ of the prism bar PB, where the prism angle $\theta_p$ refers to an angle between the inclined surface and the bottom surface of the prism bar PB and the incident angle $\theta_i$ refers to an angle between a propagation direction of the light LR, which is incident through the inclined surface, and a direction N perpendicular to the bottom surface of the light guide plate 300. As an example, the larger the prism angle $\theta_p$, the larger the incident angle $\theta_i$.

The light provided from the light guide plate 300 may be reflected by the bottom surface of the light guide plate 300 to propagate toward the top surface of the light guide plate 300.

In the illustrated exemplary embodiments, a reflection angle $\theta_r$ may be defined as an angle between a propagating direction of the light, which is reflected by the bottom surface of the light guide plate 300 to propagate toward the top surface of the light guide plate 300, and a direction N perpendicular to the top surface of the light guide plate. When the reflection angle $\theta_r$ is larger than a critical angle, the light propagating toward the top surface of the light guide plate 300 may be reflected. When the reflection angle $\theta_r$ is less than the critical angle, the light propagating toward the top surface of the light guide plate 300 may pass through the top surface of the light guide plate 300 and may be provided to the optical film 400. The light (e.g., the third light) provided to the optical film 400 may have a planar cross-section.

The light provided to the optical film 400 may propagate in a direction changed to a specific angle and then may be provided to the display module 200 (e.g., refer to FIG. 1).

In the case where, unlike that described above, the beam splitter array BSA does not include a plurality of transflective plates, an optical sheet, such as a HOE film, may be provided between the light conversion structure 300 and the light source LS so as to change a cross-sectional shape of the light LI, which is incident from the light source LS, to a linear shape. In such a case, the light LI from the light source LS should be incident into the entire region of one of surfaces of the optical sheet, and deflected light should be wholly provided to a display module. This means that, according to a size of the display module, a size or height of the optical sheet may be increased. In other words, a thickness of the backlight unit BLU may be increased. By contrast, according to some exemplary embodiments of the invention, since the light conversion structure 300 includes a plurality of transflective plates, it may be possible to provide light LE to a large-area display module, while preventing the light conversion structure 300 from having an increased size or height. In other words, a thickness of the display device 1000 may be reduced. In an exemplary embodiment, the light LE may be emitted toward air having a refractive index $n_{air}$.

Figure 7:
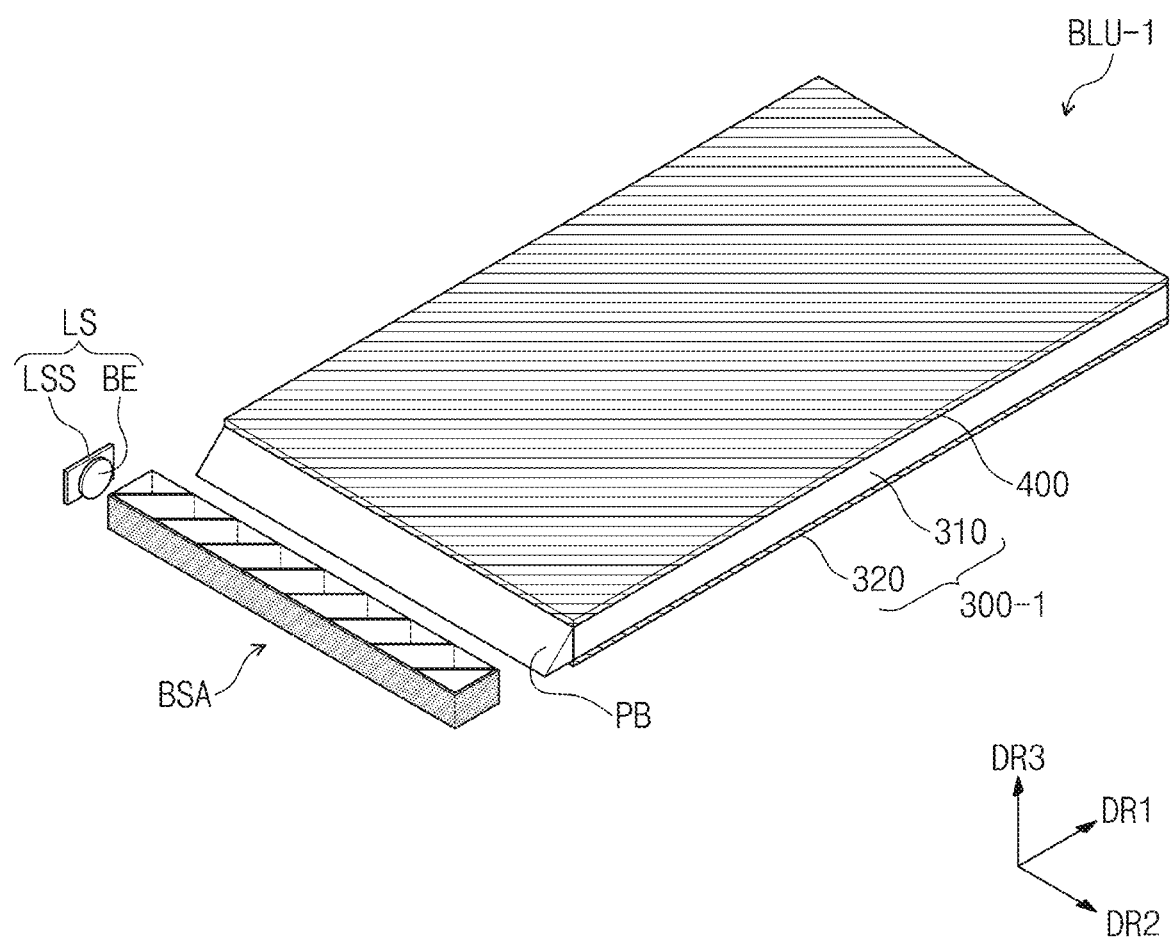
FIG. 7 is a perspective view illustrating another exemplary embodiment of a backlight unit according to the invention.

FIG. 7 is a perspective view illustrating a backlight unit according to other exemplary embodiments of the invention.

Figure 8:
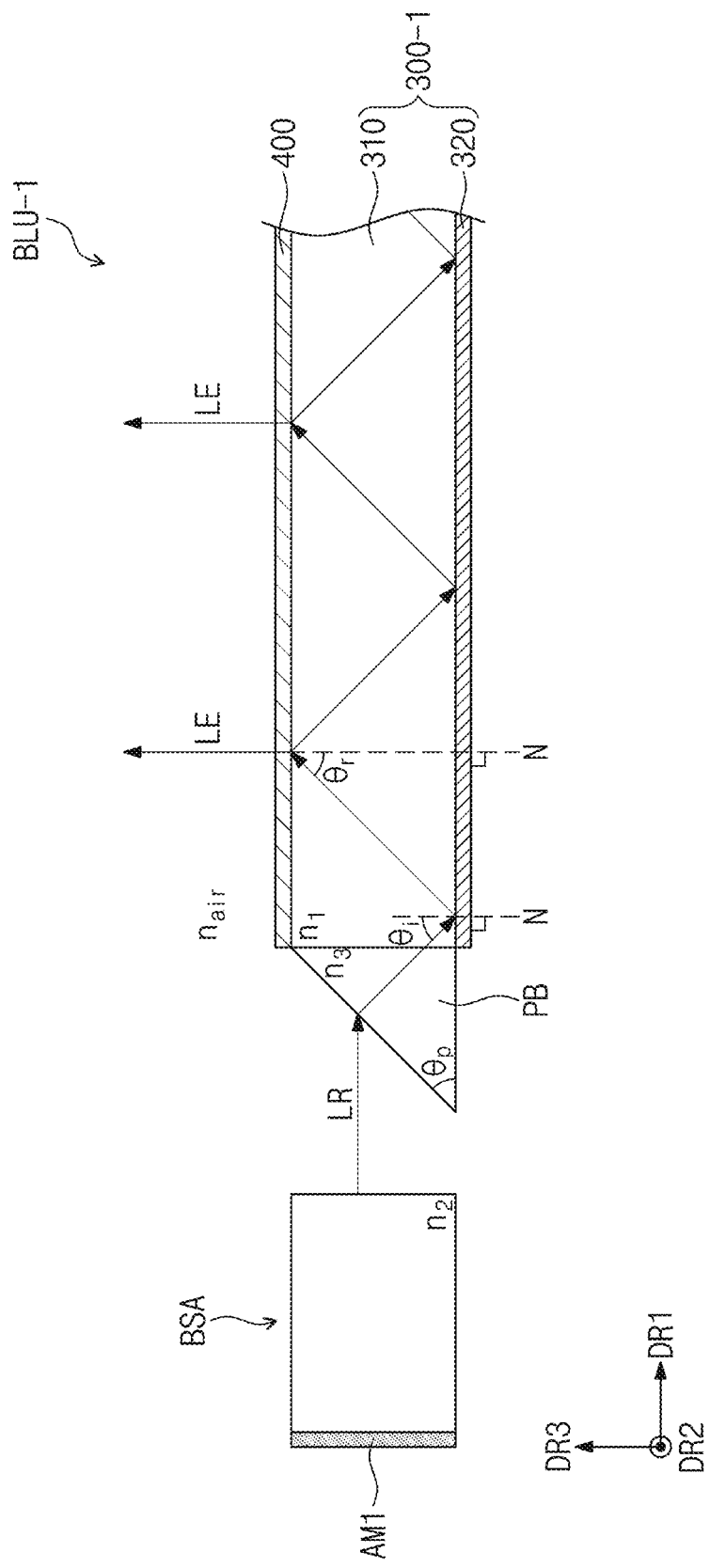
FIG. 8 is an enlarged cross-sectional view schematically illustrating a portion of the backlight unit of FIG. 7.

FIG. 8 is an enlarged cross-sectional view schematically illustrating a portion of the backlight unit of FIG. 7.

For convenience in description, the description that follows will mainly refer to different features from those in the previous embodiments, and elements not mentioned above may have the same features as those in the previous embodiment. For concise description, a previously described element may be identified by a similar or identical reference number without repeating an overlapping description thereof.

Referring to FIGS. 7 and 8, a light conversion structure 300-1 of the backlight unit BLU-1, according to other exemplary embodiments of the invention may include a light guide plate 310 and a reflection plate 320 provided below the light guide plate 310.

The reflection plate 320 may reflect light downwardly propagating in the light guide plate 310 in the upward direction. The reflection plate 320 may consist of or include an optically reflective material. In an exemplary embodiment, the reflection plate 320 may consist of or include aluminum (Al) or silver (Ag), for example.

In the illustrated exemplary embodiments, the reflection plate 320 is illustrated to have a plate-shaped structure, but the invention is not limited thereto. In other exemplary embodiments, to replace the reflection plate 320, a bottom surface of the light guide plate 310 may be coated with an ink including a reflective material.

Furthermore, FIGS. 7 and 8 illustrate the reflection plate 320 that is fully overlapped with the light guide plate 310, in a top plan view, but the invention is not limited thereto. In other exemplary embodiments, the reflection plate 320 may extend in the first direction DR1 and may cover a bottom surface of the prism bar PB. In other words, in a top plan view, the reflection plate 320 may be fully overlapped with bottom surfaces of the light guide plate 310 and the prism bar PB.

Figure 9:
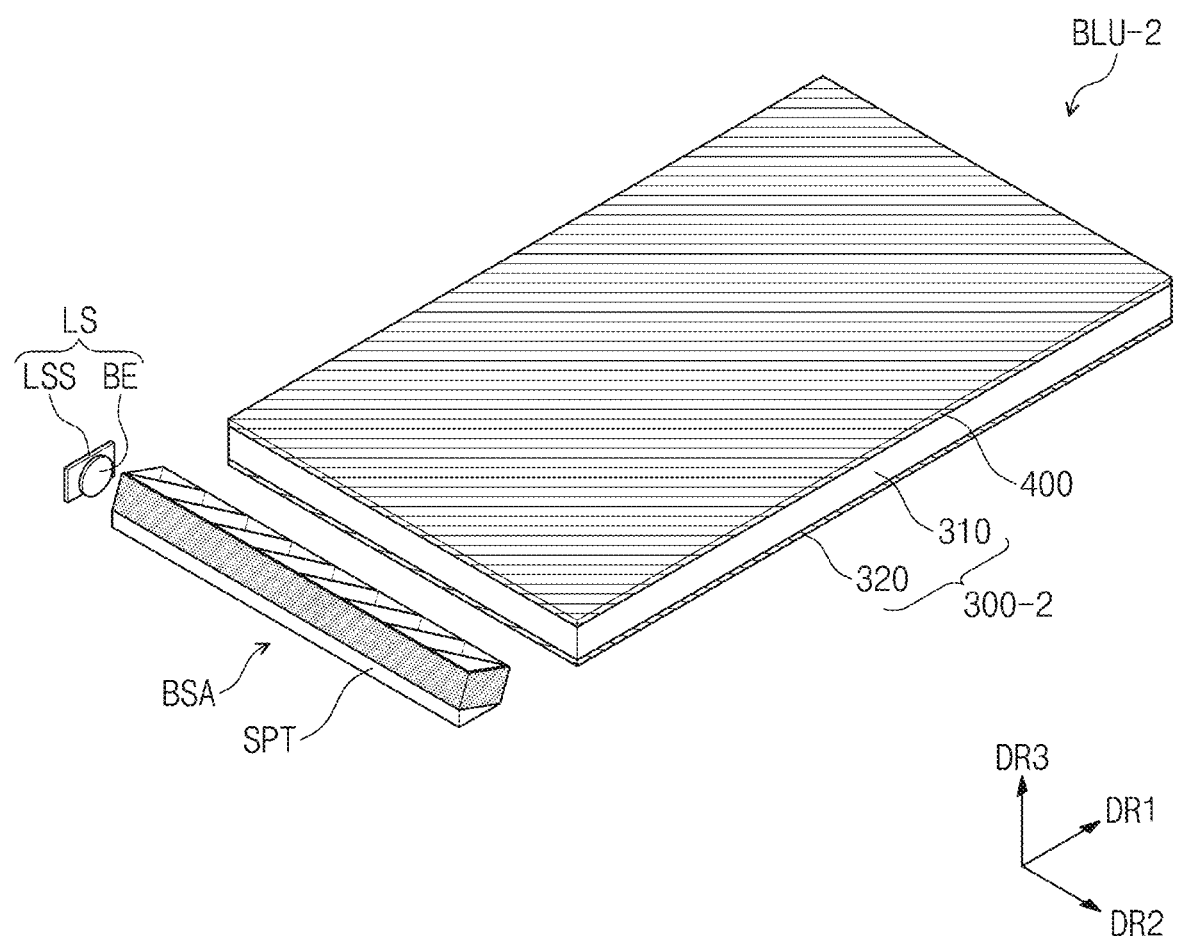
FIG. 9 is a perspective view illustrating another exemplary embodiment of a backlight unit according to the invention.
Figure 10:
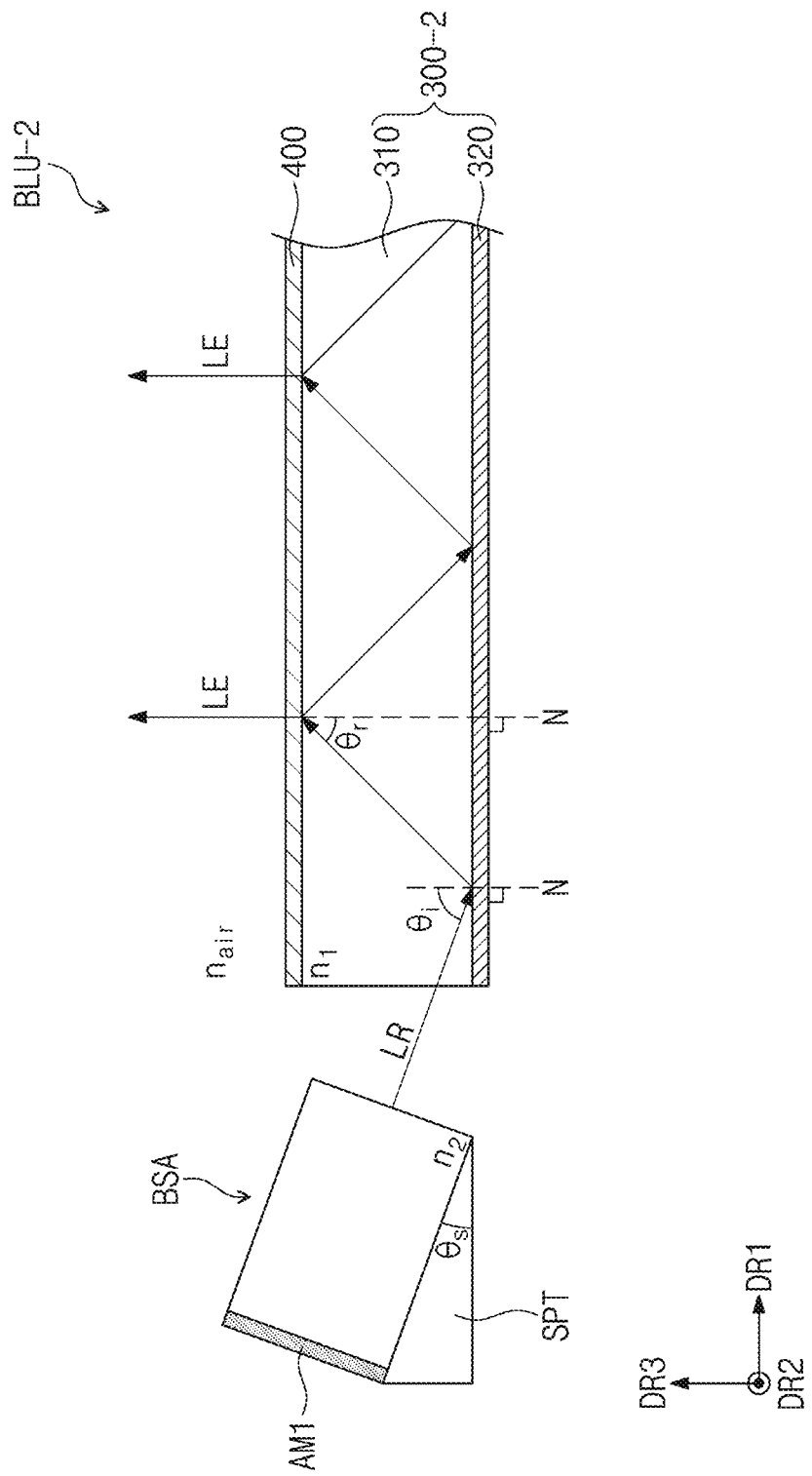
FIG. 10 is an enlarged cross-sectional view schematically illustrating a portion of the backlight unit of FIG. 9.

FIG. 9 is a perspective view illustrating a backlight unit according to still other exemplary embodiments of the invention, and FIG. 10 is an enlarged cross-sectional view schematically illustrating a portion of the backlight unit of FIG. 9.

For convenience in description, the description that follows will mainly refer to different features from those in the previous embodiments, and elements not mentioned below may have the same features as those in the previous embodiment. For concise description, a previously described element may be identified by a similar or identical reference number without repeating an overlapping description thereof.

Referring to FIGS. 9 and 10, a backlight unit BLU-2, according to still other exemplary embodiments of the invention, may further include a supporting member SPT.

The supporting member SPT may be provided below the beam splitter array BSA to support the beam splitter array BSA. The supporting member SPT may be a right triangular pillar-shaped structure extending in the second direction DR2.

The supporting member SPT may include a supporting surface, which supports the beam splitter array BSA and is inclined toward a light conversion structure 300-2. That is, the supporting member SPT may have an inclined surface whose height decreases in a direction from the third surface of the beam splitter array BSA toward the second surface.

Owing to the supporting member SPT, the light LR emitted from the beam splitter array BSA may propagate in a downwardly inclined direction. In other words, even when the prism bar PB is not provided, the light LR (e.g., the second light), which is incident into the light guide plate 310, propagates in a downwardly inclined direction by the supporting member SPT, and thus, the light LR (e.g., the second light) may be more easily reflected in the light guide plate 310.

In some exemplary embodiments, an incident angle $\theta_i$ of the light LR may be changed depending on a supporting angle $\theta_s$ of the supporting member SPT, where the supporting angle $\theta_s$ refers to an angle between the supporting and bottom surfaces of the supporting member SPT and the incident angle $\theta_i$ refers to an angle between a propagation direction of the light LR a direction N perpendicular to and the bottom surface of the light guide plate 310 when the light LR is incident into the light conversion structure 300-2. As an example, the larger the supporting angle $\theta_s$, the smaller the incident angle $\theta_i$.

Figure 11:
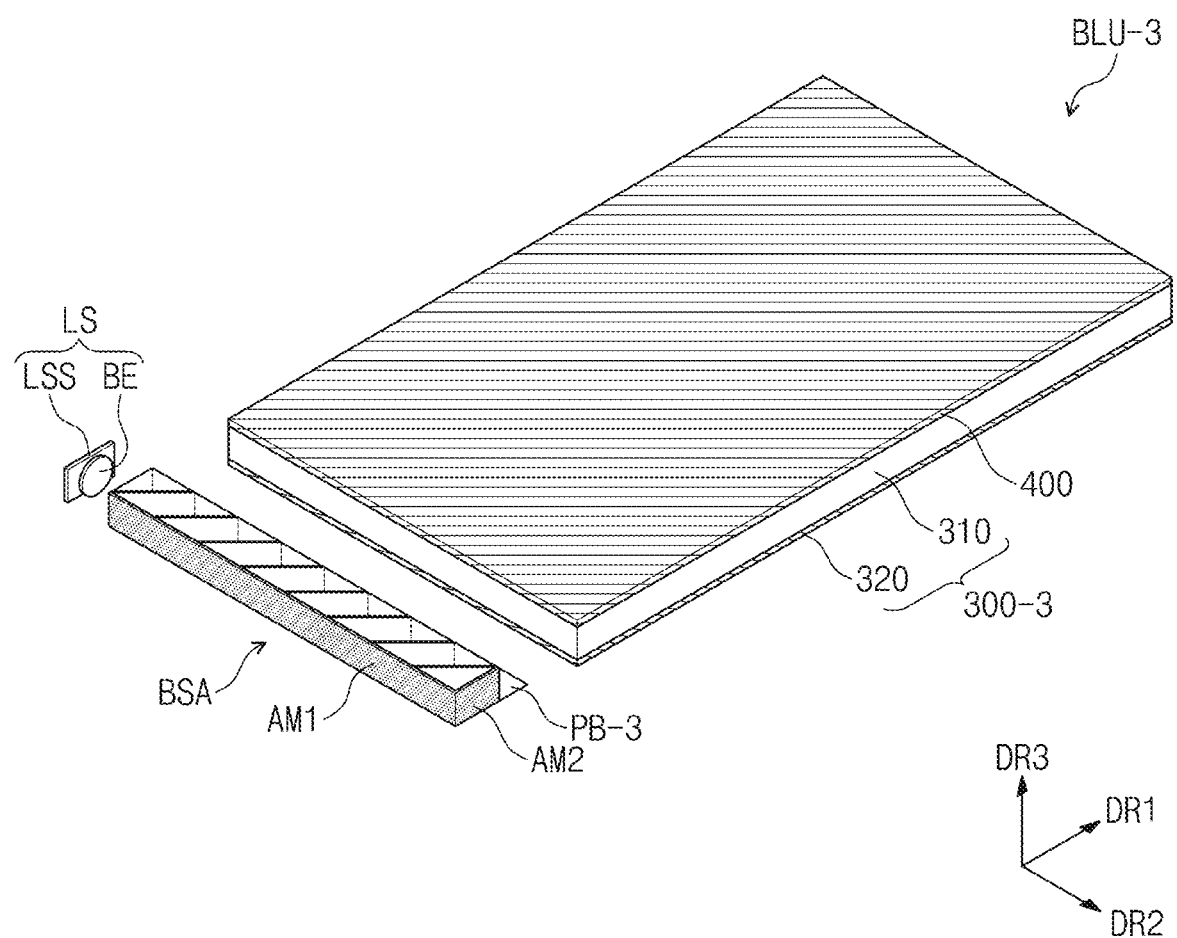
FIG. 11 is a perspective view illustrating another exemplary embodiment of a backlight unit according to the invention.
Figure 12:
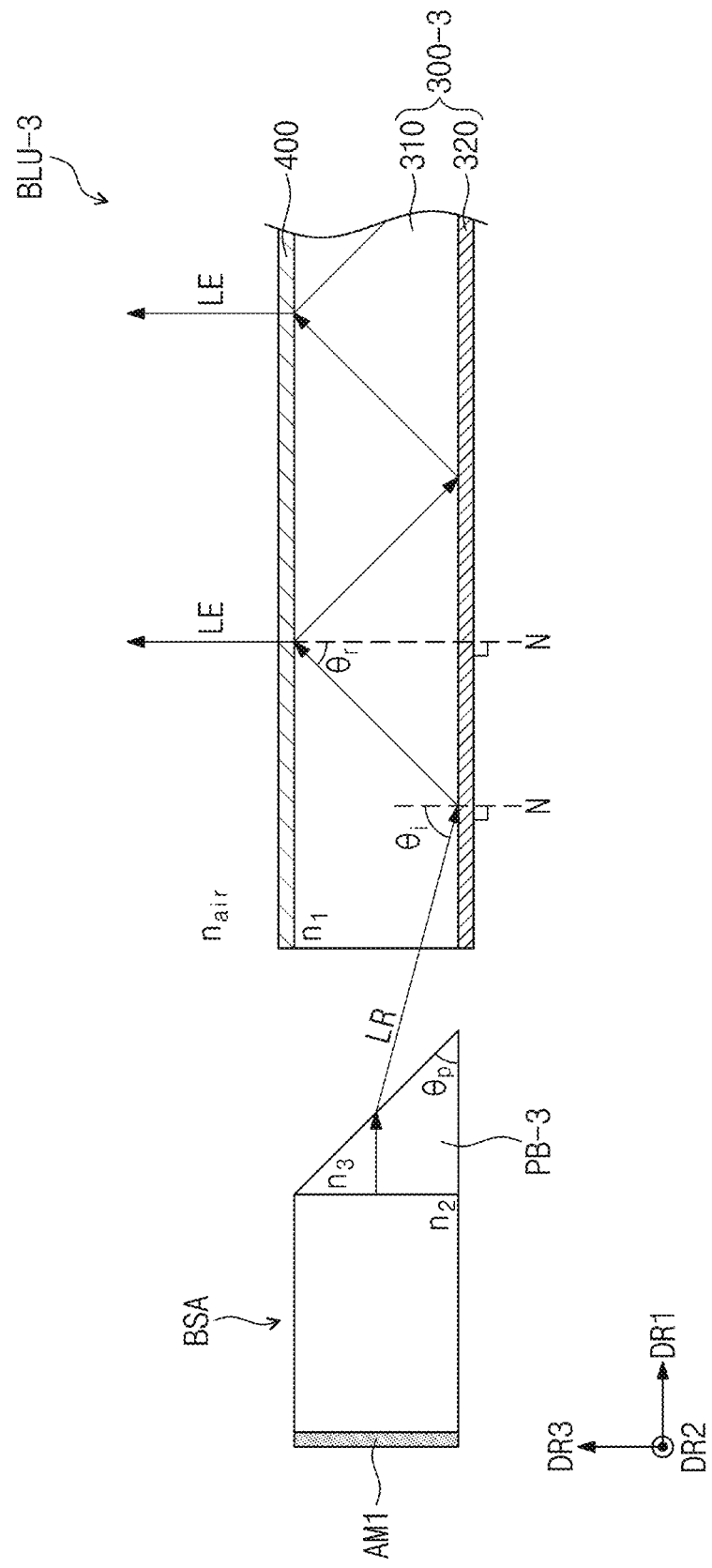
FIG. 12 is an enlarged cross-sectional view schematically illustrating a portion of the backlight unit of FIG. 11.

FIG. 11 is a perspective view illustrating a backlight unit according to even other exemplary embodiments of the invention, and FIG. 12 is an enlarged cross-sectional view schematically illustrating a portion of the backlight unit of FIG. 11.

For convenience in description, the description that follows will mainly refer to different features from those in the previous embodiments, and elements not mentioned above may have the same features as those in the previous embodiment. For concise description, a previously described element may be identified by a similar or identical reference number without repeating an overlapping description thereof.

Referring to FIGS. 11 and 12, a prism bar PB-3 of a backlight unit BLU-3, according to even other exemplary embodiments of the invention, may be a right triangular pillar-shaped structure with an inclined surface. The inclined surface of the prism bar PB-3 may be inclined toward a light conversion structure 300-3. In an exemplary embodiment, a height of the inclined surface of the prism bar PB-3 may decrease with increasing distance from the beam splitter array BSA and with decreasing distance from the light conversion structure 300-3, for example.

In the illustrated exemplary embodiments, the prism bar PB-3 and the beam splitter array BSA may be coupled to form a single body. Accordingly, light (e.g., the second light) emitted from the inclined surface of the prism bar PB-3 may be incident into the light guide plate 310.

In the illustrated exemplary embodiments, a refractive index of the light transmission part BD (refer to FIG. 2) of the beam splitter array BSA may be the same as that of the prism bar PB-3.

FIG. 11 illustrates the second absorption member AM2 that is overlapped with only the fourth surface of the beam splitter array BSA, but the invention is not limited thereto. In other exemplary embodiments, the second absorption member AM2 may extend in the first direction DR1 and may cover a side surface of the prism bar PB-3 in the second direction DR2.

Figure 13:
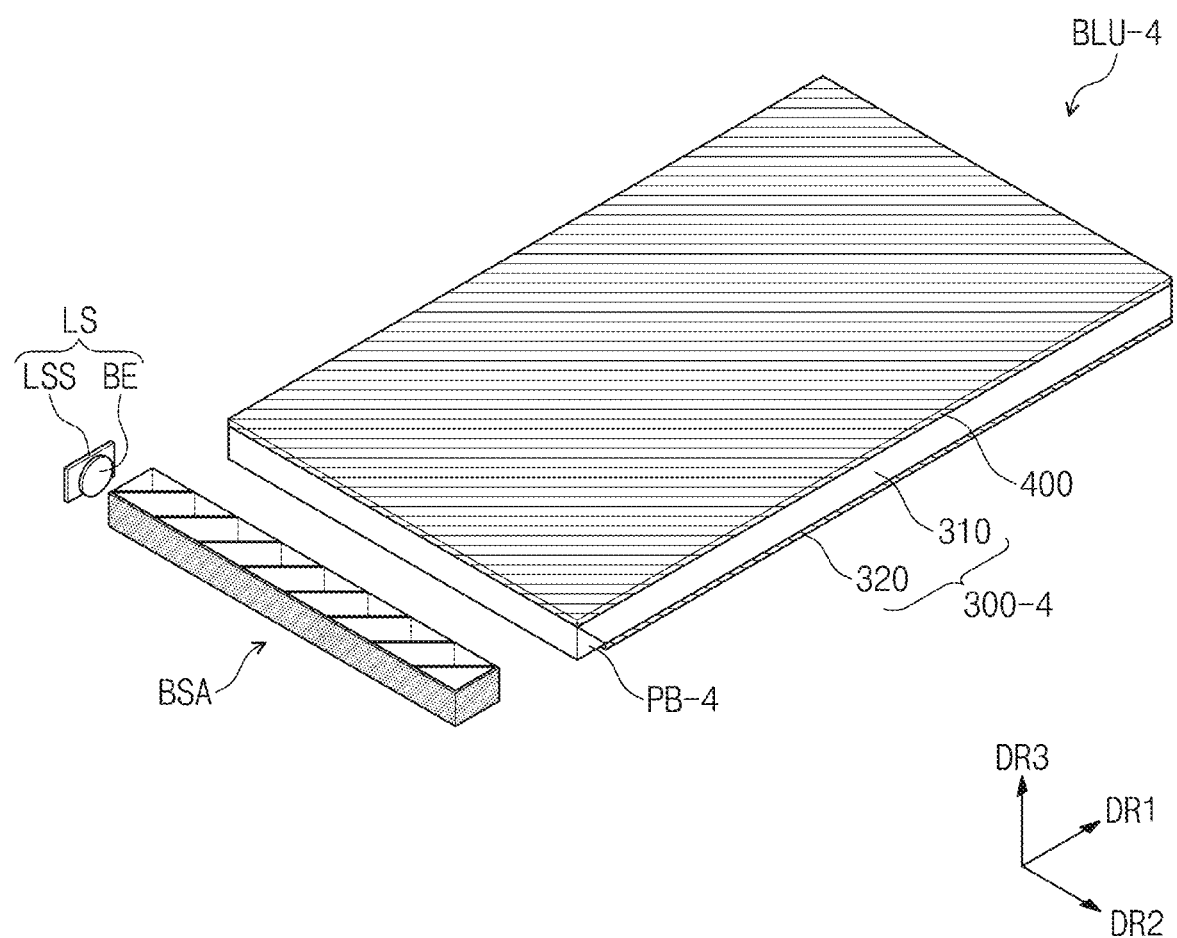
FIG. 13 is a perspective view illustrating another exemplary embodiment of a backlight unit according to the invention.
Figure 14:
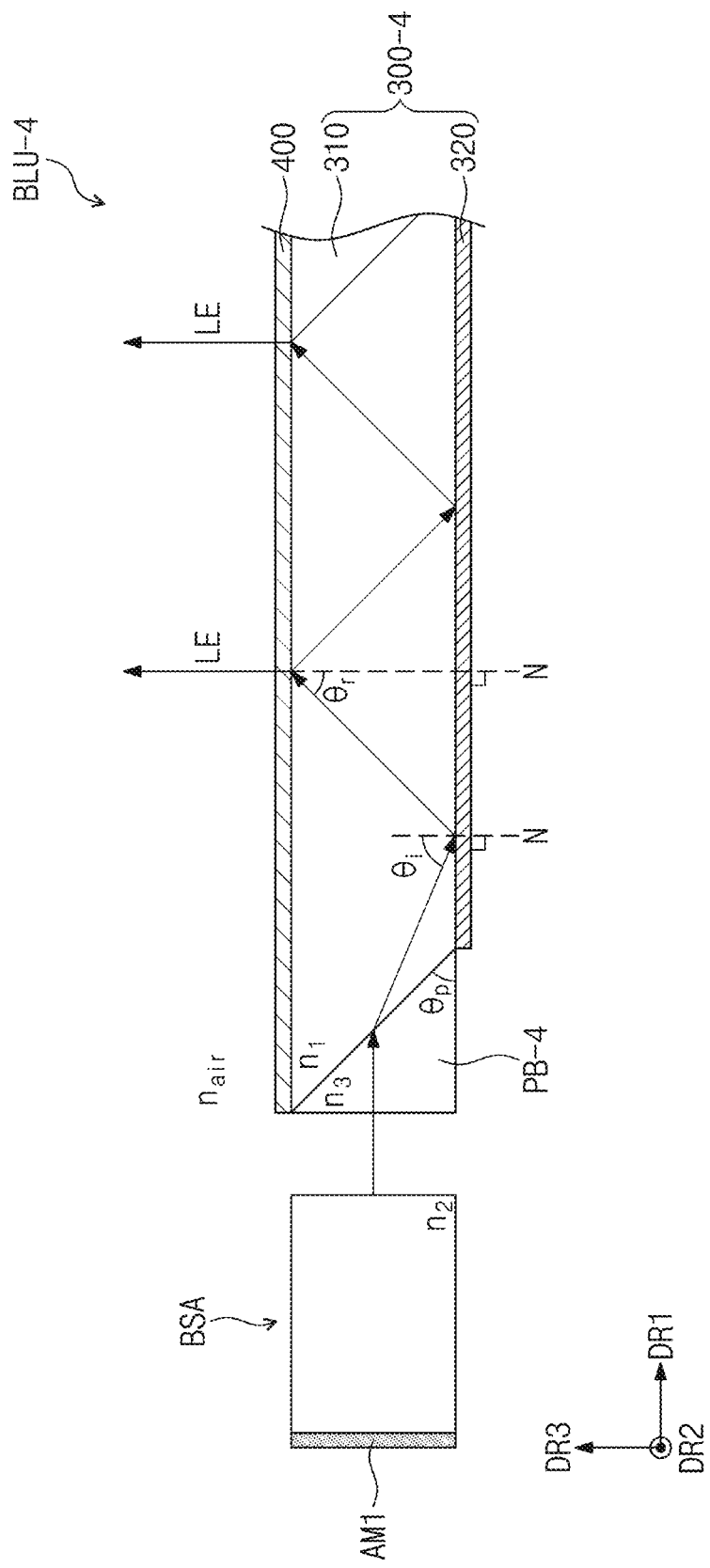
FIG. 14 is an enlarged cross-sectional view schematically illustrating a portion of the backlight unit of FIG. 13.

FIG. 13 is a perspective view illustrating a backlight unit according to yet other exemplary embodiments of the invention, and FIG. 14 is an enlarged cross-sectional view schematically illustrating a portion of the backlight unit of FIG. 13.

For convenience in description, the description that follows will mainly refer to different features from those in the previous embodiments, and elements not mentioned below may have the same features as those in the previous embodiment. For concise description, a previously described element may be identified by a similar or identical reference number without repeating an overlapping description thereof.

Referring to FIGS. 13 and 14, a light conversion structure 300-4 and a prism bar PB-4 of the backlight unit BLU-4, according to yet other exemplary embodiments of the invention, may be provided to form a single body.

In detail, the prism bar PB-4 may have an inclined surface that is inclined toward the light guide plate 310. In other words, a height of the inclined surface of the prism bar PB-4 may decrease with increasing distance from the beam splitter array BSA.

Furthermore, in the illustrated exemplary embodiments, a side portion of the light guide plate 310 in the first direction DR1 may have a tapered shape, for example. An area of the light guide plate 310 may decrease in a direction from a top surface of the light guide plate 310 to a bottom surface of the light guide plate 310.

The prism bar PB-4 and the light guide plate 310 may be coupled to behave like a single body. The coupled structure of the prism bar PB-4 and the light guide plate 310 may have a rectangular parallelepiped shape. A tapering angle of the light guide plate 310 may be the same as a prism angle $\theta_p$ of the prism bar PB-4. Accordingly, a light incidence surface (or a tapering surface) of the light guide plate 310 may be in contact with the inclined surface of the prism bar PB-4 in entirety. In this case, a refractive index of the light guide plate 300 may be different from that of the prism bar PB-4.

FIGS. 13 and 14 illustrate the reflection plate 320 that is provided to cover only the bottom surface of the light guide plate 310, but the invention is not limited thereto. In other exemplary embodiments, the reflection plate 320 may extend in the first direction DR1 and may cover a bottom surface of the prism bar PB-4.

Figure 15:
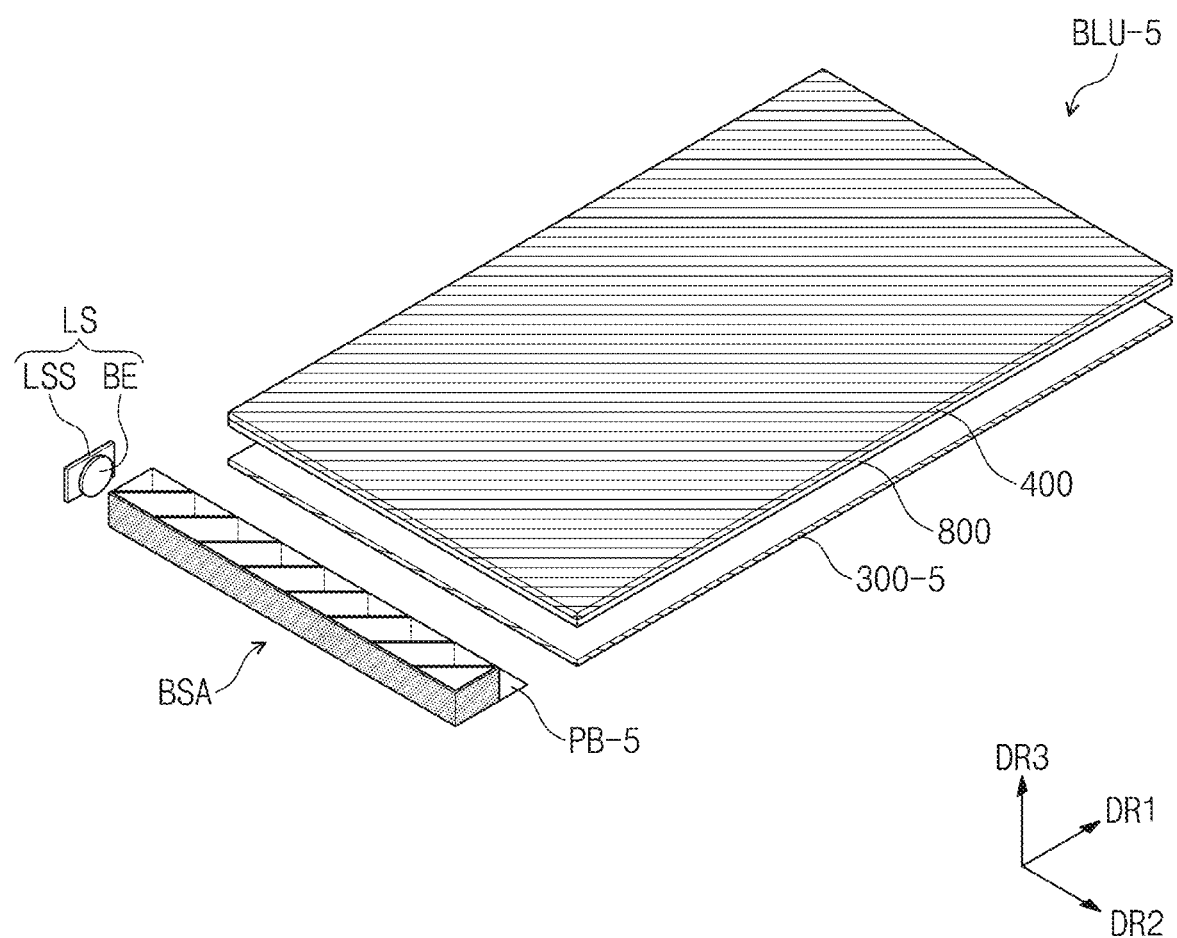
FIG. 15 is a perspective view illustrating another exemplary embodiment of a backlight unit according to the invention.
Figure 16:
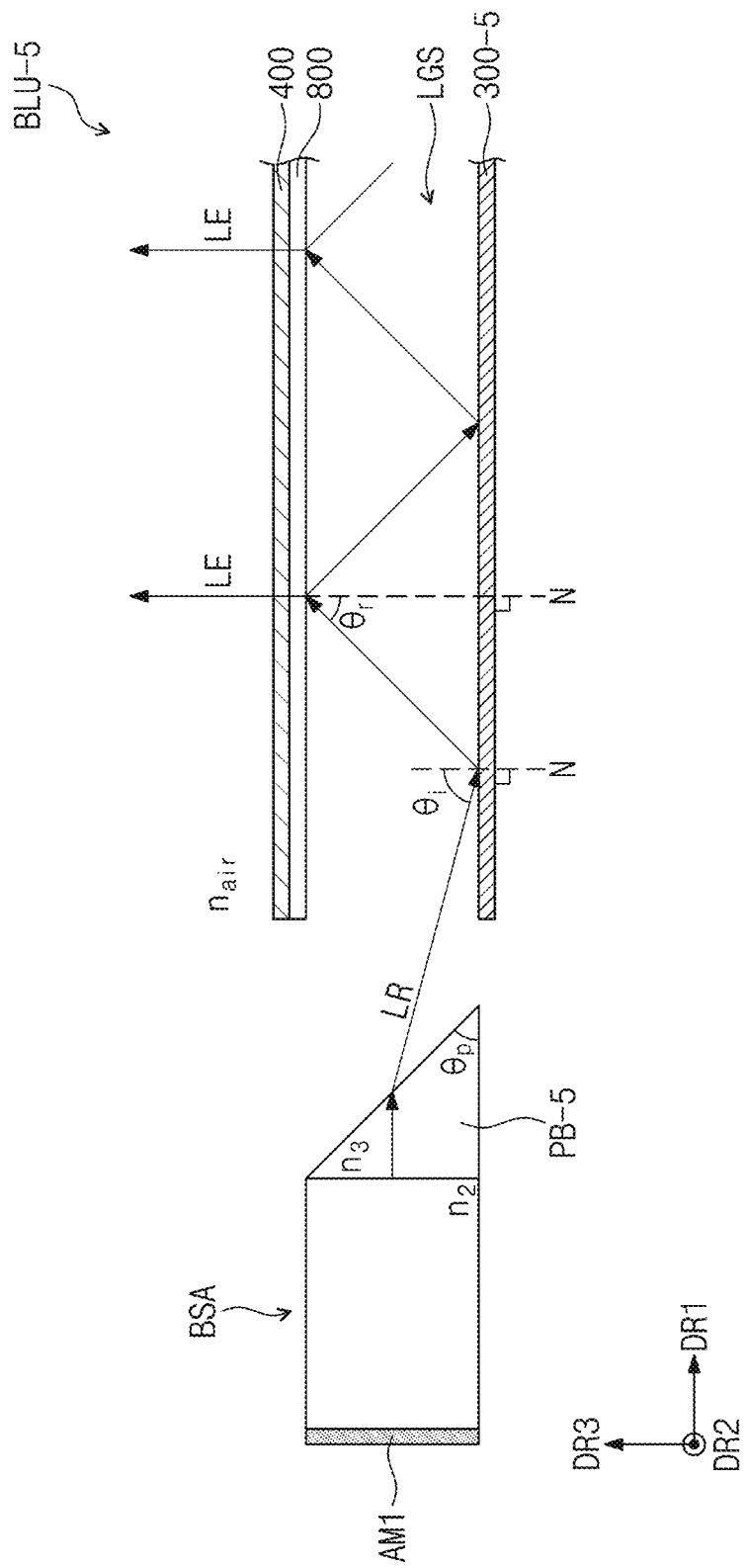
FIG. 16 is an enlarged cross-sectional view schematically illustrating a portion of the backlight unit of FIG. 15.

FIG. 15 is a perspective view illustrating a backlight unit according to further embodiments of the invention, and FIG. 16 is an enlarged cross-sectional view schematically illustrating a portion of the backlight unit of FIG. 15.

For convenience in description, the description that follows will mainly refer to different features from those in the previous embodiments, and elements not mentioned below may have the same features as those in the previous embodiment. For concise description, a previously described element may be identified by a similar or identical reference number without repeating an overlapping description thereof.

Referring to FIGS. 15 and 16, a light conversion structure 300-5 according to further embodiments of the invention may have only a reflection plate (i.e., a reflection plate 300-5). In other words, the light guide plate may not be provided in the light conversion structure 300-5.

In detail, in the illustrated exemplary embodiments, the backlight unit BLU-5 may further include a base substrate 800. The base substrate 800 may be provided below and laminated with the optical film 400. The base substrate 800 may support the bottom surface of the optical film 400.

The base substrate 800 may be spaced apart from the reflection plate 300-5. Accordingly, a light guide space LGS may be defined between the base substrate 800 and the reflection plate 300-5.

A prism bar PB-5 of FIGS. 15 and 16 may have the same structure as the prism bar PB-3 of FIGS. 11 and 12, and thus, a detailed description thereof will be omitted.

The prism bar PB-5 may change a propagation direction of light, which is emitted from the beam splitter array BSA, to the downward direction. The light LR propagating in the downward direction may be reflected by the reflection plate 300-5 and, as a result of the repetitive reflection in the light guide space LGS, the light LR may be incident into the optical film 400.

Figure 17:
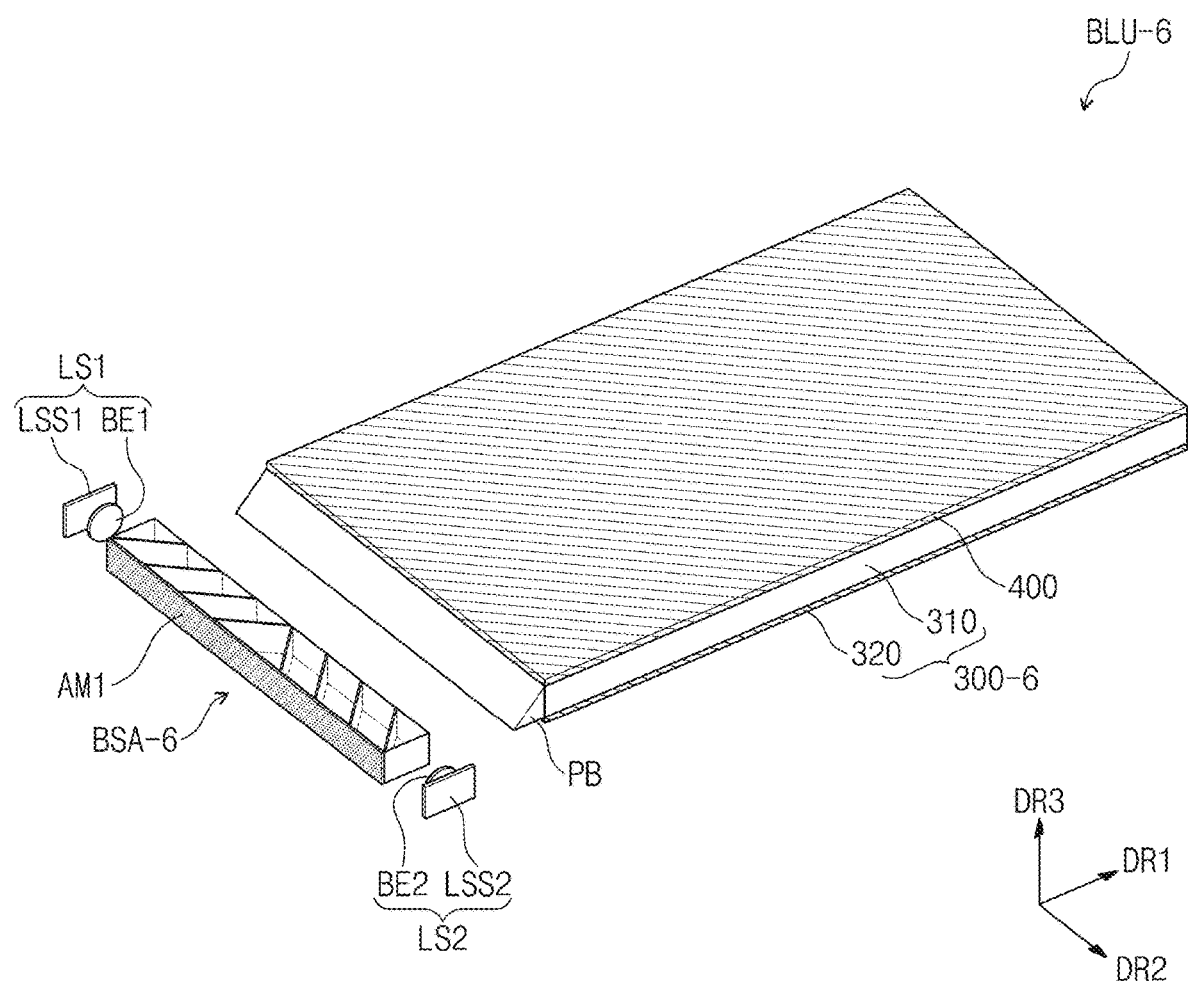
FIG. 17 is a perspective view illustrating another exemplary embodiment of a backlight unit according to the invention.

FIG. 17 is a perspective view illustrating a backlight unit according to still further embodiments of the invention.

Figure 18:
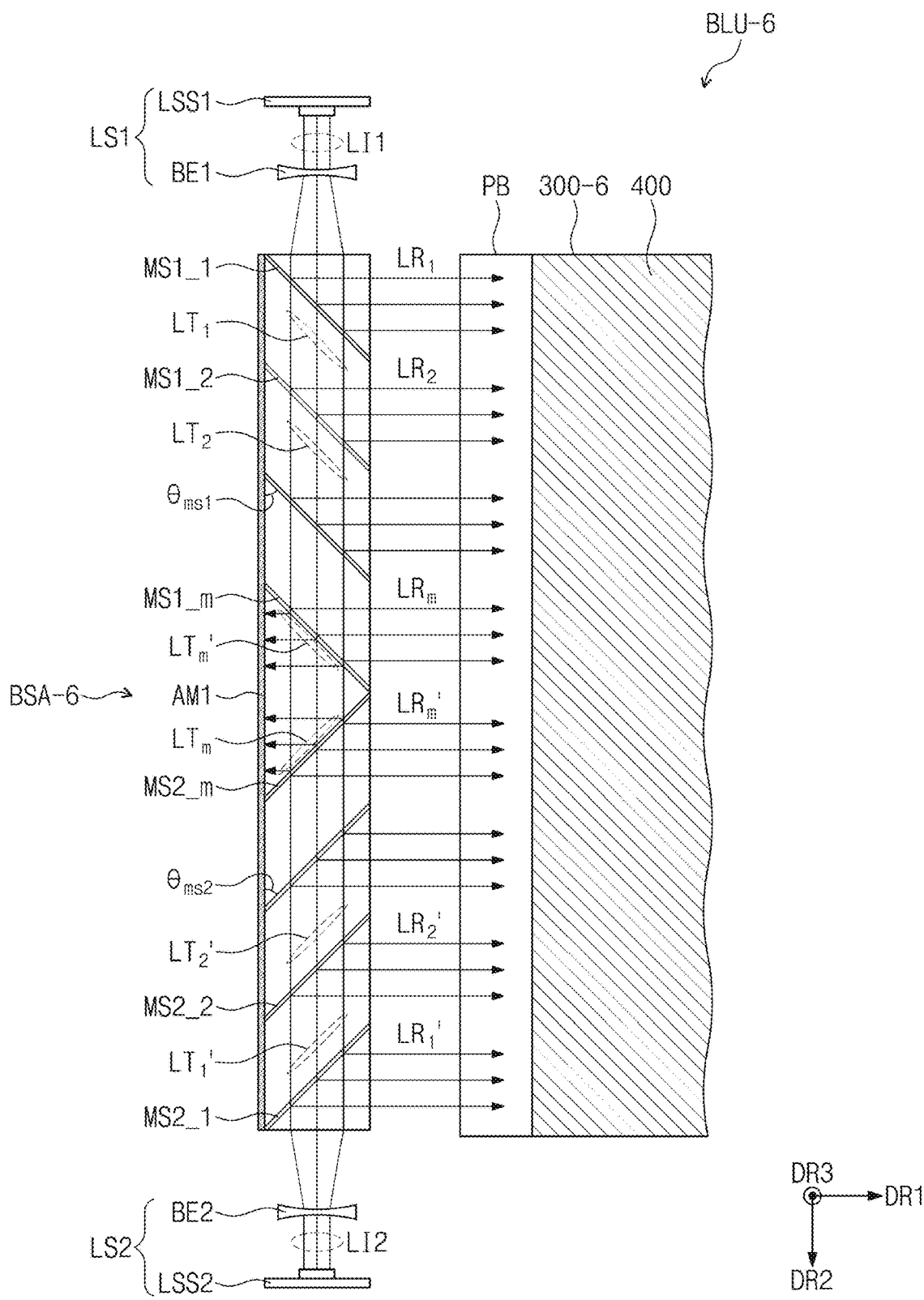
FIG. 18 is a top plan view illustrating the backlight unit of FIG. 17.

FIG. 18 is a top plan view illustrating the backlight unit of FIG. 17.

For convenience in description, the description that follows will mainly refer to different features from those in the previous embodiments, and elements not mentioned below may have the same features as those in the previous embodiment. For concise description, a previously described element may be identified by a similar or identical reference number without repeating an overlapping description thereof.

Referring to FIGS. 17 and 18, the light source LS according to still further embodiments of the invention may include a first light source LS1 and a second light source LS2. The backlight unit BLU-6 may include the light conversion structure 300-6.

The first light source LS1 and the second light source LS2 may be provided to face each other with a beam splitter array BSA-6 interposed therebetween in the second direction DR2. In detail, the first light source LS1 may be provided adjacent to a side surface of the beam splitter array BSA-6 in the second direction DR2, and the second light source LS2 may be provided adjacent to an opposite side surface of the beam splitter array BSA-6 in in the second direction DR2.

The first light source LS1 may include a first light source unit LSS1 and a first beam expander BE1, and the second light source LS2 may include a second light source unit LSS2 and a second beam expander BE2.

A first beam expander BE1 may be provided between the first light source unit LSS1 and the beam splitter array BSA-6. A light LI1 generated by the first light source unit LSS1 may be expanded by the first beam expander BE1 and then may be incident into the first surface of the beam splitter array BSA-6.

A second beam expander BE2 may be provided between the second light source unit LSS2 and the beam splitter array BSA-6. A light LI2 generated by the second light source unit LSS2 may be expanded by the second beam expander BE2 and then may be incident into the fourth surface of the beam splitter array BSA-6.

The beam splitter array BSA-6 may include a plurality of first transflective plates MS1_1-MS1_$m$ and a plurality of second transflective plates MS2_1-MS2_$m$. The first transflective plates MS1_1-MS1_$m$ and the second transflective plates MS2_1-MS2_$m$ may be arranged in the second direction DR2.

The first transflective plates MS1_1-MS1_$m$ may be provided to be tilted at an angle of about 45° relative to a propagation direction of the light LI1 incident from the first light source LS1. In other words, each of the first transflective plates MS1_1-MS1_$m$ may be inclined at a first transflective plate angle $\theta_{ms1}$ of about 45° relative to the second direction DR2. In detail, each of the first transflective plates MS1_1-MS1_$m$ may be tilted by an angle of about 45° in a clockwise direction from the first surface of the beam splitter array BSA-6 and by an angle of about 45° in a counter-clockwise direction from the third surface.

The second transflective plates MS2_1-MS2_$m$ may be provided to be tilted at an angle of about 45° relative to a propagation direction of the light LI2 incident from the second light source LS2. In other words, each of the second transflective plates MS2_1-MS2_$m$ may be inclined at a second transflective plate angle $\theta_{ms2}$ of about −45° relative to the second direction DR2. In detail, each of the second transflective plates MS2_1-MS2_$m$ may be tilted by an angle of about 45° in the counterclockwise direction from the fourth surface of the beam splitter array BSA-6 and by an angle of about 45° in the clockwise direction from the third surface. In other words, the first transflective plates MS1_1-MS1_$m$ may be arranged at a right angle to the second transflective plates MS2_1-MS2_$m$.

In the illustrated exemplary embodiments, the first transflective plates MS1_1-MS1_$m$ may be provided adjacent to the first light source LS1, compared with the second transflective plates MS2_1-MS2_$m$, and the second transflective plates MS2_1-MS2_$m$ may be provided adjacent to the second light source LS2, compared with the first transflective plates MS1_1-MS1_$m$. At a center region of the beam slitter array BSA-6, the first transflective plate MS1_$m$ may be adjacent to the second transflective plate MS2_$m$.

In the illustrated exemplary embodiments, the first absorption member AM1 may be locally provided on only the third surface of the beam splitter array BSA.

In the illustrated exemplary embodiments, the number of the first transflective plates MS1_1-MS1_$m$ may be equal to that of the second transflective plates MS2_1-MS2_$m$, but the invention is not limited thereto. In other exemplary embodiments, the number of the first transflective plates MS1_1-MS1_$m$ may be different from that of the second transflective plates MS2_1-MS2_$m$.

Figure 19:
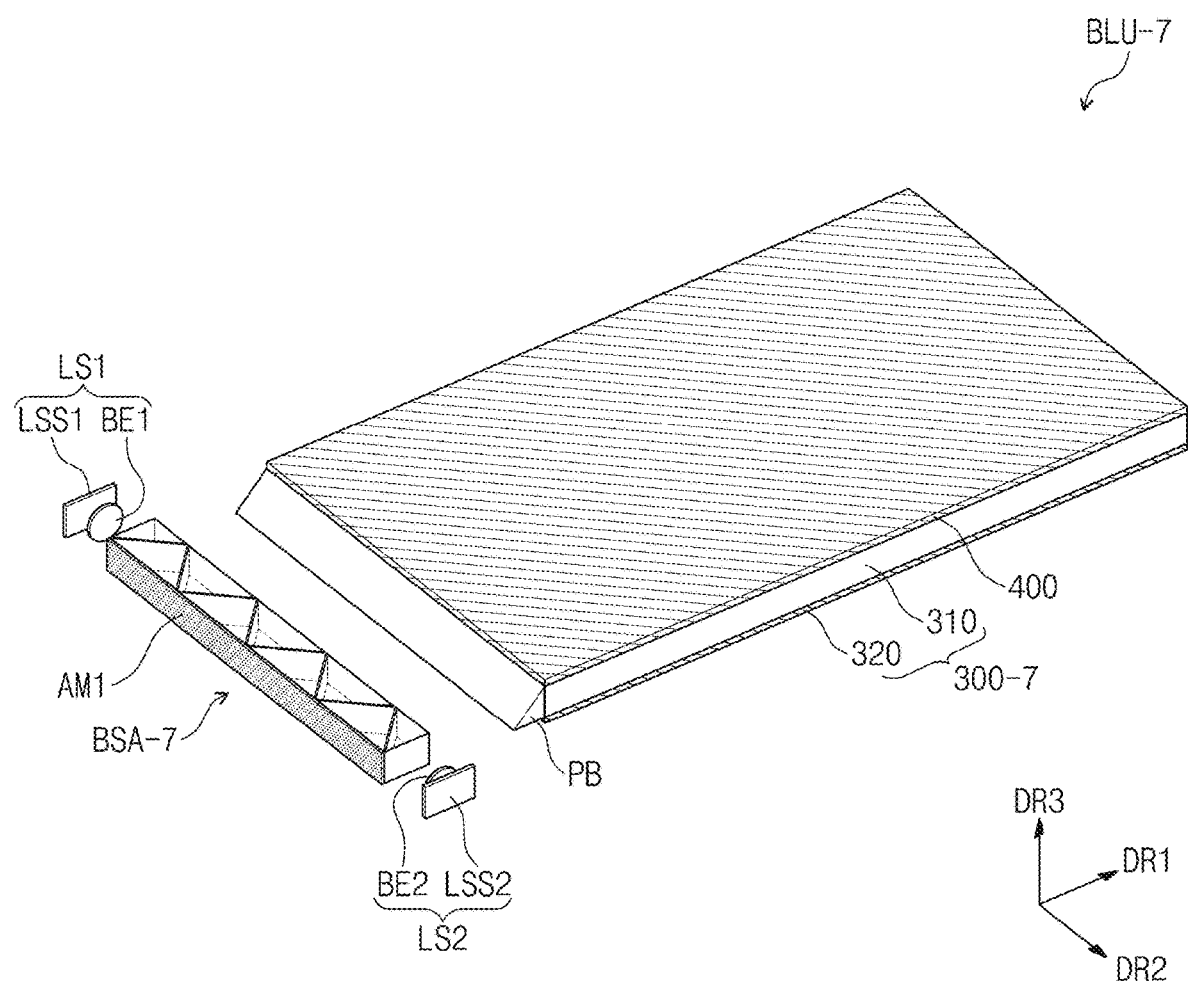
FIG. 19 is a perspective view illustrating another exemplary embodiment of a backlight unit according to the invention.

FIG. 19 is a perspective view illustrating a backlight unit according to yet further embodiments of the invention.

Figure 20:
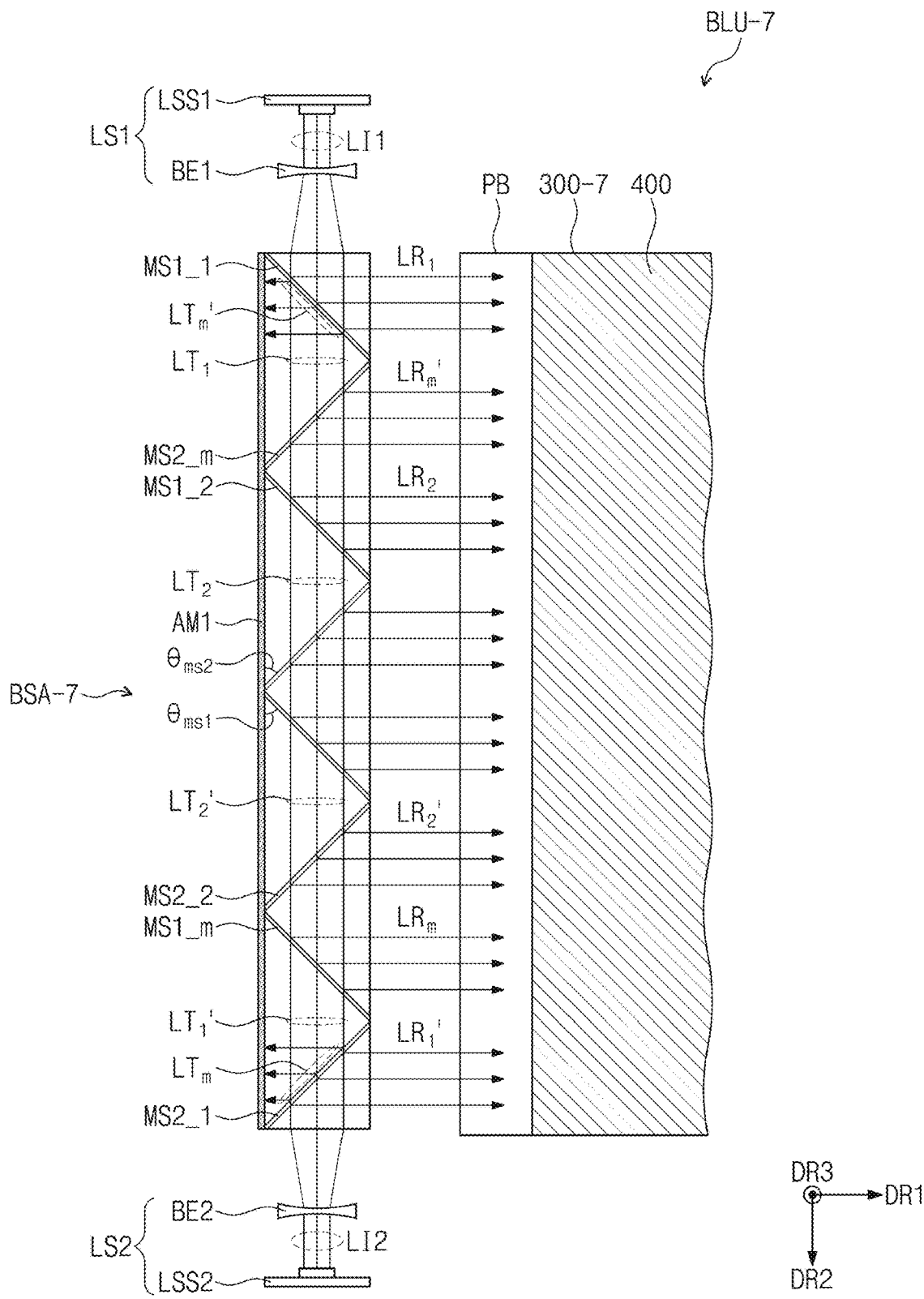
FIG. 20 is a top plan view illustrating the backlight unit of FIG. 19.

FIG. 20 is a top plan view illustrating the backlight unit of FIG. 19.

For convenience in description, the description that follows will mainly refer to different features from those in the previous embodiments, and elements not mentioned below may have the same features as those in the previous embodiment. For concise description, a previously described element may be identified by a similar or identical reference number without repeating an overlapping description thereof.

Referring to FIGS. 19 and 20, a beam splitter array BSA-7 according to yet further embodiments of the invention may include a plurality of first transflective plates MS1_1-MS1_$m$ and a plurality of the second transflective plates MS2_1-MS2_$m$. The backlight unit BLU-7 may include the light conversion structure 300-7.

The first transflective plates MS1_1-MS1_$m$ and the second transflective plates MS2_1-MS2_$m$ may be alternately arranged in the second direction DR2. In detail, each of the second transflective plates MS2_1-MS2_$m$ may be provided between a corresponding pair of adjacent ones of the first transflective plates MS1_1-MS1_$m$.

In the illustrated exemplary embodiments, each of the first and second transflective plates MS1_1-MS1_$m$ and MS2_1-MS2_$m$ may have a difference in transmittance and reflectance between front and back surfaces thereof.

The back surface of each of the first and second transflective plates MS1_1-MS1_$m$ and MS2_1-MS2_$m$ may have transmittance higher than that of the front surface thereof. Accordingly, even when light is incident into the back surface of the second transflective plates MS2_1-MS2_$m$ through the first transflective plates MS1_1-MS1_$m$, a reduction in amount of light may be small.

In the first and second transflective plates MS1_1-MS1_$m$ and MS2_1-MS2_$m$, respective m-th transflective plates (i.e., MS1_$m$ and MS2_$m$) may have the front surfaces whose transmittance is zero.

In other exemplary embodiments, when the m-th transflective plates (i.e., MS1_$m$ and MS2_$m$) have the front sides having non-vanishing transmittance, respective first transflective plates (i.e., MS1_1 and MS2_1) may have back surfaces whose transmittance is zero. Accordingly, even when there are light beams $LT_m$ and $LT_m'$ passing through the m-th transflective plates (i.e., MS1_$m$ and MS2_$m$), the light beams $LT_m$ and $LT_m'$ may be absorbed by respective back surfaces of the first transflective plates (i.e., MS1_1 and MS2_1) or may be reflected to be absorbed by the absorption member AM1.

Figure 21:
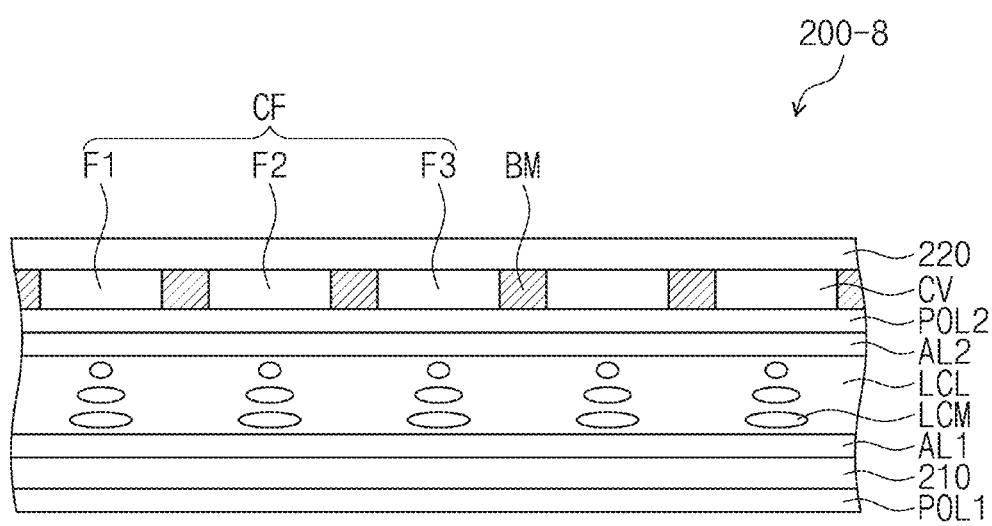
FIG. 21 is a cross-sectional view illustrating another exemplary embodiment of a display module according to the invention.

FIG. 21 is a cross-sectional view illustrating a display module according to other exemplary embodiments of the invention.

For convenience in description, the description that follows will mainly refer to different features from those in the previous embodiments, and elements not mentioned below may have the same features as those in the previous embodiment. For concise description, a previously described element may be identified by a similar or identical reference number without repeating an overlapping description thereof.

Referring to FIG. 21, a display module 200-8 according to other exemplary embodiments of the invention may include a first polarization layer POL1, the first substrate 210, the second substrate 220, the liquid crystal layer LCL, a color filter layer CV, and a second polarization layer POL2.

The first polarization layer POL1 may be provided at the lowermost level of the display module 200-8 and may change polarization of the light provided from the backlight unit BLU (refer to FIG. 1). The first polarization layer POL1 may have a transmission axis with a predetermined direction.

The first substrate 210 may be provided on the first polarization layer POL1. The liquid crystal layer LCL may be interposed between the first substrate 210 and the second substrate 220.

The second polarization layer POL2 may be provided between the liquid crystal layer LCL and the second substrate 220. The second polarization layer POL2 may have an absorption axis (not shown) with a predetermined direction. When a display mode of the display device 1000 (refer to FIG. 1) is in a bright state, the second polarization layer POL2 may pass the light, and when the display mode of the display device 1000 is in a dark state, the second polarization layer POL2 may absorb the light.

An angle between the transmission axis of the first polarization layer POL1 and the absorption axis of the second polarization layer POL2 may be changed depending on an orientation mode of liquid crystal molecules LCM. As an example, the transmission axis of the first polarization layer POL1 may be orthogonal to the absorption axis of the second polarization layer POL2, in a top plan view.

The color filter layer CV may be disposed between the second substrate 220 and second polarization layer POL2. The color filter layer CV may include a plurality of conversion filters CF and a black matrix BM.

The conversion filters CF may transmit light, which is incident into the color filter layer CV, with a changed color or without a change in color, depending on the energy of the incident light. The light LE (e.g., refer to FIG. 6) provided from the backlight unit BLU may be converted to lights of various colors by the color filter layer CV, and this conversion may display a color image.

The conversion filters CF may include a plurality of quantum dots. Each of the quantum dots may absorb at least a part of the incident light and then to emit light with specific color or may transmit at least a part of the incident light without any change in color. In the case where light incident into the conversion filter CF is energetic enough to cause excitation of the quantum dots, each of the quantum dots may absorb at least a part of the incident light and may become an excited state, and in this case, the quantum dot may emit light of specific color, when the quantum dot returns to a lower energy state. By contrast, in the case where the energy of the incident light is insufficient to excite the quantum dot, the incident light may be emitted to the outside through the conversion filter CF without any change in color.

In the illustrated exemplary embodiments, the plurality of conversion filters CF may include a first conversion filter F1, a second conversion filter F2, and a third conversion filter F3. The black matrix BM may be disposed between the first, second, and third conversion filters F1, F2, and F3 to define a border of each of the first, second, and third conversion filters F1, F2, and F3.

The first, second, and third conversion filters F1, F2, and F3 may convert light, which is incident into the color filter layer CV, to lights having respectively different wavelengths.

In the illustrated exemplary embodiments, quantum dots, which are respectively included in the first, second, and third conversion filters F1, F2, and F3, may have sizes different from one another. In other words, the wavelength of the converted light may be determined by a particle size of the quantum dot. Accordingly, the second conversion filter F2 may include a quantum dot having the largest particle size, and the third conversion filter F3 may include a quantum dot having the smallest particle size. In other exemplary embodiments, the third conversion filter F3 may not include any quantum dot.

The black matrix BM may be provided adjacent to the conversion filter CF. The black matrix BM may consist of or include a light blocking material. The black matrix BM may have a shape corresponding to that of a peripheral region (not shown). The black matrix BM may prevent light from being leaked through any other region, except for a pixel region (not shown) that displays an image, or prevent a light leakage phenomenon from occurring. That is, the black matrix BM may clarify boundaries between adjacent ones of the pixel regions.

According to some exemplary embodiments of the invention, it may be possible to reduce a thickness of a display device.

While exemplary embodiments of the invention have been particularly shown and described, it will be understood by one of ordinary skill in the art that variations in form and detail may be made therein without departing from the spirit and scope of the attached claims.

What is claimed is:

1. A display device, comprising:
   a display module; and
   a backlight unit which provides a light having a coherent property to the display module, the backlight unit comprising:
      a light source comprising a light source unit which generates the light having the coherent property and a beam expander which expands the light generated by the light source unit;
      a beam splitter array comprising a plurality of transflective plates which transmit or reflect the light provided from the light source;
      a light conversion structure which is disposed below the display module, receives the light reflected by the plurality of transflective plates and guides the received light in a direction toward the display module; and
      an optical film which is disposed on the light conversion structure and changes a propagation direction of light, which is incident from the light conversion structure, to a predetermined direction,
   wherein the beam expander is interposed between the light source unit and the beam splitter array,
   wherein the display module displays a hologram image, and
   wherein the optical film is a holographic optical element (HOE) film.

2. The display device of claim 1, wherein the optical film comprises a plurality of diffraction patterns.

3. The display device of claim 1, wherein each of the plurality of transflective plates is tilted at an angle of about 45 degrees relative to a propagation direction of the light provided from the light source, in a top plan view.

4. The display device of claim 1, wherein the plurality of transflective plates has decreasing transmittance and increasing reflectance when a distance between the plurality of transflective plates and the light source increases.

5. The display device of claim 1, wherein the beam splitter array further comprises a light transmission part including a transparent material, and
   the plurality of transflective plates is disposed in the light transmission part.

6. The display device of claim 5, wherein the light conversion structure comprises a light guide plate.

7. The display device of claim 6, further comprising a prism bar disposed between the light guide plate and the beam splitter array,
   wherein the prism bar extends parallel to a light incidence surface of the light guide plate and change a propagation direction of light which is incident into the light guide plate from the beam splitter array.

8. The display device of claim 7, wherein the prism bar is a right triangular pillar-shaped structure with an inclined surface.

9. The display device of claim 8, wherein the prism bar is coupled with the light guide plate to form a single body, and the inclined surface is inclined toward the beam splitter array.

10. The display device of claim 9, wherein the prism bar has a refractive index which is substantially the same as that of the light guide plate.

11. The display device of claim 8, wherein the prism bar is coupled with the beam splitter array to form a single body, and
   the inclined surface is inclined toward the light guide plate.

12. The display device of claim 11, wherein the light transmission part has a refractive index which is substantially the same as that of the prism bar.

13. The display device of claim 8, wherein the prism bar is coupled with the light guide plate to form a single body, the inclined surface of the prism bar is inclined toward the light guide plate, and
   a light incidence surface of the light guide plate is in contact with the inclined surface of the prism bar in entirety.

14. The display device of claim 13, wherein the prism bar has a different refractive index from that of the light guide plate.

15. The display device of claim 6, wherein the light conversion structure further comprises a reflection plate disposed below the light guide plate.

16. The display device of claim 5, wherein the beam splitter array further comprises:
   a first surface, to which the light generated by the light source is incident;
   a second surface, from which light reflected by the plurality of transflective plates is emitted, the second surface facing the light conversion structure;
   a third surface disposed opposite to the second surface; and
   a fourth surface disposed opposite to the first surface.

17. The display device of claim 16, wherein the beam splitter array further comprises:
   a first absorption member disposed on the third surface; and
   a second absorption member disposed on the fourth surface.

18. The display device of claim 5, wherein the light conversion structure comprises a reflection plate.

19. The display device of claim 18, further comprising an optical film, which is disposed on the reflection plate to change a propagation direction of light, which is incident from the reflection plate, to a predetermined direction,
   wherein the reflection plate and the optical film are spaced apart from each other to define a light guide space therebetween.

20. The display device of claim 19, further comprising a prism bar disposed between the light guide space and the beam splitter array,
   wherein the prism bar extends in parallel to the beam splitter array, is coupled with the beam splitter array to form a single body, and changes a propagation direction of light, which is emitted from the beam splitter array, to a direction toward the reflection plate.

21. The display device of claim 20, further comprising a base substrate, which is disposed between the reflection plate and the optical film and is laminated with the optical film to support the optical film.

22. The display device of claim 1, wherein the plurality of transflective plates includes a metallic material.

23. The display device of claim 1, further comprising a supporting member, which is disposed below the beam splitter array and has a supporting surface inclined toward the light conversion structure.

24. The display device of claim 1, wherein the light source comprises a plurality of light sources, and
the plurality of light sources is disposed to face each other with the beam splitter array interposed therebetween.

25. The display device of claim 24, wherein the plurality of light sources comprises:
a first light source placed adjacent to a side surface of the beam splitter array; and
a second light source placed adjacent to an opposite side surface of the beam splitter array,
wherein the plurality of transflective plates comprise:
a plurality of first transflective plates, which are tilted at an angle of about 45 degrees relative to a propagating direction of light provided from the first light source, in a top plan view; and
a plurality of second transflective plates, which are tilted at an angle of about 45 degrees relative to a propagating direction of light provided from the second light source, in the top plan view, and
wherein the plurality of first transflective plates is arranged at a right angle to the plurality of second transflective plates.

26. The display device of claim 25, wherein the plurality of first transflective plates and the plurality of second transflective plates have decreasing transmittance and increasing reflectance, with decreasing distance from a center region of the beam splitter array.

27. The display device of claim 26, wherein the plurality of first transflective plates is arranged adjacent to the first light source, compared with the plurality of second transflective plates.

28. The display device of claim 26, wherein the plurality of first transflective plates and the plurality of second transflective plates are alternately arranged.

29. The display device of claim 28, wherein each of the plurality of first transflective plates and the plurality of second transflective plates includes a back surface having a transmittance higher than that of a front surface.

30. The display device of claim 1, wherein the display module comprises:
a first substrate including a plurality of pixels;
a second substrate opposite to the first substrate; and
a liquid crystal layer interposed between the first substrate and the second substrate.

31. The display device of claim 1, wherein the display module comprises:
a first polarization plate having a transmission axis;
a first substrate disposed on the first polarization plate, the first substrate comprising a plurality of pixels;
a second substrate opposite to the first substrate and disposed with a color filter layer;
a liquid crystal layer interposed between the first substrate and the second substrate; and
a second polarization plate disposed between the liquid crystal layer and the color filter layer, the second polarization plate having an absorption axis,
wherein the color filter layer comprises a plurality of quantum dots.

32. A display device, comprising:
a display module; and
a backlight unit which provides a light having a coherent property to the display module, the backlight unit comprising:
a light source comprising a light source unit which generates a first light having the coherent property and a point-like cross-section and a beam expander which expands the light generated by the light source unit;
a beam splitter array, which is disposed adjacent to the light source, converts the first light provided from the light source to a second light having a linear cross-section, and comprises a plurality of transflective plates;
a light conversion structure, which is disposed below the display module and converts the second light provided from the beam splitter array to a third light having a planar cross-section; and
an optical film which is disposed on the light conversion structure and changes a propagation direction of light, which is incident from the light conversion structure, to a predetermined direction,
wherein the plurality of transflective plates is arranged parallel to a propagation direction of the first light and reflects at least a part of the first light in a direction toward the light conversion structure,
wherein the beam expander is interposed between the light source unit and the beam splitter array,
wherein the display module displays a hologram image, and
wherein the optical film is a holographic optical element (HOE) film.

33. A backlight unit, comprising:
a light source comprising a light source unit which generates a light having a coherent property and a beam expander which expands the light generated by the light source unit;
a light guide plate which guides a propagating direction of light incident thereto to an upward direction;
a beam splitter array disposed between the light source and the light guide plate, the beam splitter array comprising a plurality of transflective plates; and
an optical film which is disposed on the light conversion structure and changes a propagation direction of light, which is incident from the light conversion structure, to a predetermined direction,
wherein each of the plurality of transflective plates reflects a part of the light provided from the light source toward the light guide plate and passes another part of the light to be incident into another adjacent one of the plurality of transflective plates,
wherein the beam expander is interposed between the light source unit and the beam splitter array, and
wherein the optical film is a holographic optical element (HOE).

* * * * *